(12) United States Patent
Chinnam et al.

(10) Patent No.: US 12,735,318 B2
(45) Date of Patent: Sep. 15, 2026

(54) SULFIDE-BASED COMPOSITE SOLID STATE ELECTROLYTES AND RELATED METHODS

(71) Applicant: Rivian IP Holdings, LLC, Plymouth, MI (US)

(72) Inventors: Parameswara Rao Chinnam, Fremont, CA (US); Forrest Stephen Gittleson, Mountain View, CA (US); Asma Sharafi, Foster City, CA (US); Chen Chen, Newark, CA (US); Hui Dong, Santa Clara, CA (US); Sonika Rajput, San Jose, CA (US); Terri Chai Lin, Fremont, CA (US); Saravanan Kuppan, San Jose, CA (US); Ezhiylmurugan Rangasamy, Oakland, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 681 days.

(21) Appl. No.: 18/128,814

(22) Filed: Mar. 30, 2023

(65) Prior Publication Data

US 2024/0332611 A1 Oct. 3, 2024

(51) Int. Cl.

| | |
|---|---|
| ***H01M 10/0565*** | (2010.01) |
| ***C01B 17/22*** | (2006.01) |
| ***H01M 10/0585*** | (2010.01) |

(52) U.S. Cl.

CPC ......... *C01B 17/22* (2013.01); *H01M 10/0565* (2013.01); *H01M 10/0585* (2013.01); *H01M 2300/0082* (2013.01)

(58) Field of Classification Search

None

See application file for complete search history.

(56) References Cited

U.S. PATENT DOCUMENTS

2022/0041861 A1 2/2022 Roy et al.

FOREIGN PATENT DOCUMENTS

| | | | | |
|---|---|---|---|---|
| CA | 2854596 | A1 | * | 5/2013 |
| CN | 112909327 | A | * | 6/2021 |
| JP | 2004-519824 | A | | 7/2004 |
| TW | 550597 | B | * | 9/2003 |
| TW | 200946335 | A1 | * | 11/2009 |
| WO | WO 2008/070059 | A2 | * | 6/2008 |
| WO | WO 2022/040373 | A1 | | 2/2022 |

* cited by examiner

*Primary Examiner* — Tae H Yoon

(74) *Attorney, Agent, or Firm* — BakerHostetler

(57) ABSTRACT

Particular embodiments may provide a solid sulfide electrolyte. Specifically, disclosed herein are methods and systems that can include feeding polymer precursors and sulfides to an extruder, kneading the polymer precursors and the sulfide in the extruder to form a sulfide-polymer composite that includes polyurethane and sulfide, and extruding the sulfide-polymer composite to form a solid sulfide electrolyte.

20 Claims, 18 Drawing Sheets

101
102
nO=C=N–C6H4–CH2–C6H4–N=C=O + nHO–CH2–CH2–OH
4,4-MDI
ethane-1,2-diol
103
[–C(=O)–NH–C6H4–CH2–C6H4–NH–C(=O)–O–CH2–CH2–O–]n
a polyurethane
the urethane linkage
104

FIG. 1A $HO-[(CH_2-CH{=}C(R)-CH_2)_x(CH_2-C(R)(CH{=}CH_2))_y]_n-OH$ 205

R = H Polybutadiene diol
R = CH3 Polyisoprene diol $HOCH_2CH_2-[CH_2-CH(CH_2CH_3)]_n-CH_2CH_2OH$ 206

*Aliphatic diisocyanates - IPDI and HDI* 401

FIG. 6

SULFIDE-BASED COMPOSITE SOLID STATE ELECTROLYTES AND RELATED METHODS

INTRODUCTION

The disclosure is generally directed to solid sulfide electrolytes and systems and methods of making such electrolytes, which can be used in lithium-ion batteries.

BRIEF SUMMARY

Some sulfide electrolytes may not be chemically compatible with polar solvents. Specifically, the poor compatibility with polar solvents can force the selection of polymer binders that are soluble in nonpolar solvents to manufacture various layers for a battery cell. The quality and uniformity of the electrode (crack free), and cohesion and adhesion between binder and particles can depend on the polymer-sulfide interaction, glass transition temperature, and elastic modulus. However, most of these properties can depend on the chemical structure of the polymer backbone. In general, sulfides are polar in nature and currently used binders (such as styrene-isoprene-styrene (SIS), styrene-ethylene/butylene-styrene (SEBS), etc.) are nonpolar. Thus, the microphases of such sulfide electrolytes may separate at the molecular level resulting in brittle films. These films may require high stack pressure to make good contact with Li metal and composite cathodes which can exacerbate embrittlement. The next generation of binders for sulfide electrolytes should be able to balance hydrophobic and hydrophilic groups to have good compatibility with sulfides, conformal coating, good adhesion, and elasticity. The more hydrophilic portion of block copolymers (e.g., polyacrylonitrile-polystyrene (PS-PAN)) with PAN>30 wt % may not be soluble in the solvents that are compatible with sulfides, limiting the selection of binders with better properties. Thus, today's solutions to these problems focus on finding the right solvent for the known binders even though they may not be the best for adhesion and/or interfacial contact and/or finding the binders that are soluble in sulfide compatible solvents. However, these solutions may not be that advantageous because of polarity mismatch between ideal binders and solvents.

Disclosed herein are systems and methods of manufacturing solid sulfide electrolytes. Specifically, the systems and methods can synthesize a polymer (from polymer/binder precursors) with a sulfide in-situ within an extruder and extrude it into the solid sulfide electrolyte. These methods and systems can eliminate or minimize the role of a polymer binders and/or solvents on sulfide electrolytes. In addition, these systems and methods can allow for the selection of polymer precursors with good adhesion, mechanical properties, and good interfacial contact.

In some embodiments, a method includes feeding a polyol, an isocyanate, and a sulfide into an extruder; kneading the polyol, the isocyanate, and the sulfide in the extruder to form a sulfide-polymer composite comprising thermoplastic polyurethane and the sulfide; and extruding the sulfide-polymer composite to form a solid electrolyte layer. In some embodiments, the polyol, the isocyanate, and the sulfide are fed into the same zone of the extruder. In some embodiments, the polyol, the isocyanate, and the sulfide are fed into different zones of the extruder. In some embodiments, an amount of solvent fed to the extruder is such that the solvent is less than 5 wt. % the total weight of all components fed into the extruder. In some embodiments, the polyol comprises polybutadiene diol, polyester diol, or combinations thereof. In some embodiments, the polyol has a molecular weight of 500-5000 g/mol. In some embodiments, the isocyanate comprises aliphatic diisocyanate, aromatic diisocyanate, or combinations thereof. In some embodiments, a ratio of polyol to isocyanate fed into the extruder is 0.5-1.5. In some embodiments, the extruder is a heated twin screw extruder. In some embodiments, all temperatures along a length of a screw barrel of the heated twin screw extruder are between 80-120° C. In some embodiments, the solid electrolyte layer has a thickness of 15-100 microns. In some embodiments, the method includes extruding the sulfide-polymer composite on a substrate comprising lithium metal. In some embodiments, the method includes feeding a lubricant into the extruder. In some embodiments, the method includes feeding a solvent compatible with the sulfide into the extruder.

In some embodiments, a solid electrolyte includes 2-10 wt. % a thermoplastic polyurethane; and 90-98 wt. % sulfide. In some embodiments, the thermoplastic polyurethane comprises: hard polymer segments comprising an aliphatic or aromatic isocyanate; and soft polymer segments comprising a polyol having a molecular weight of 500-5000 g/mol. In some embodiments, the aliphatic or aromatic isocyanate comprises aliphatic or aromatic diisocyanate. In some embodiments, the polyol comprises polybutadiene diol or polyester diol. In some embodiments, the solid electrolyte is free of solvent. In some embodiments, the solid electrolyte includes a lubricant. In some embodiments, a battery includes an anode, a cathode, and the solid electrolyte.

In some embodiments, a system includes an extruder configured to extrude a layer on a substrate comprising lithium metal, wherein the layer comprises 2-10 wt. % a thermoplastic polyurethane and 90-98 wt. % sulfide; and a calendar configured to receive the substrate comprising the layer and configured to receive a cathode film, wherein the calendar is configured to bond at least one surface of the cathode film to the layer on the substrate.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 1A illustrates an example of a polyurethane synthesis reaction in accordance with some embodiments disclosed herein;

FIG. 3 illustrates examples of isocyanates in accordance with some embodiments disclosed herein;

FIG. 6 illustrates an example of a sulfide-polymer composite (i.e., solid sulfide electrolyte) synthesis in accordance with some embodiments disclosed herein.

In the Figures, like reference numerals refer to like components unless otherwise stated herein.

DETAILED DESCRIPTION

Disclosed herein are systems and methods of manufacturing solid sulfide electrolytes that can eliminate or minimize the role of a polymer binders and/or solvents on sulfide electrolytes. As explained above, typical solid sulfide electrolyte manufacturing utilizes finding the right solvent for the known polymer binders even though they may not be ideal for adhesion and interfacial contact or finding the binders that are soluble in sulfide compatible solvents. The systems and methods disclosed herein can minimize or even eliminate solvent use in solid sulfide electrolyte manufacturing. Thus, disclosed herein is a scalable solid sulfide electrolyte manufacturing process that can utilize an extruder to synthesize a polymer binder from polymer precursors, incorporate sulfide with the polymer, and extrude the solid sulfide electrolyte.

Polymer binders that can be utilized in solid sulfide electrolytes can be those that are chemically and electrochemically stable with sulfides. For example, polymers (also used herein as a polymer binder) that can be utilized in solid sulfide electrolytes are polyurethanes such as thermoplastic polyurethane ("TPU"). TPU is a kind of block copolymer that includes alternating blocks of hard (e.g., isocyanate) and soft segments (e.g., polyol). The proportion of hard to soft segments in the TPU can be manipulated to produce a wide range of polymeric materials with various properties. For example, a higher ratio of hard to soft segments can result in a more rigid TPU. In some embodiments, the soft segments can be the polymer backbone of the TPU, whereas the hard segments can be the chain extenders of the TPU.

The way the hard and soft segments of the TPU arrange in the polymer backbone can dictate mechanical, electrochemical, and processing conditions of the TPU (and thus a solid sulfide electrolyte made with the TPU). In some embodiments, the soft segments can control the electrochemical properties of the TPU (and thus a solid sulfide electrolyte made with the TPU). For example, the soft segments can include polymers that are lithium ion conductive and/or have other high dielectric constants. In some embodiments, the hard segments can provide the mechanical and/or processing benefits of TPU (and thus a solid sulfide electrolyte made with the TPU). In other words, TPU properties are important for their use in solid sulfide electrolytes.

In some embodiments, the hard segments of the TPU can include isocyanates. As used herein, isocyanates are organic compounds comprising an isocyanate functional group with the formula —N═C═O. In some embodiments, the isocyanates are electrophilic compounds reactive toward a compound comprising a nucleophilic group, for example, an alcohol (e.g., hydroxyl group), an amine, or the like.

Figure 1A:
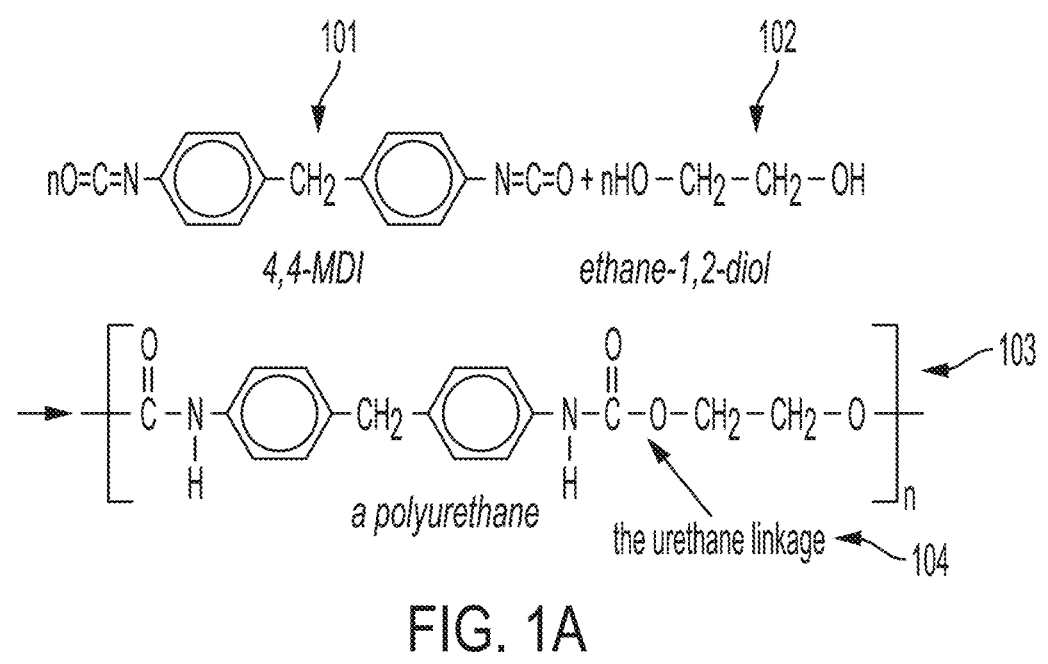
Figure 1B:
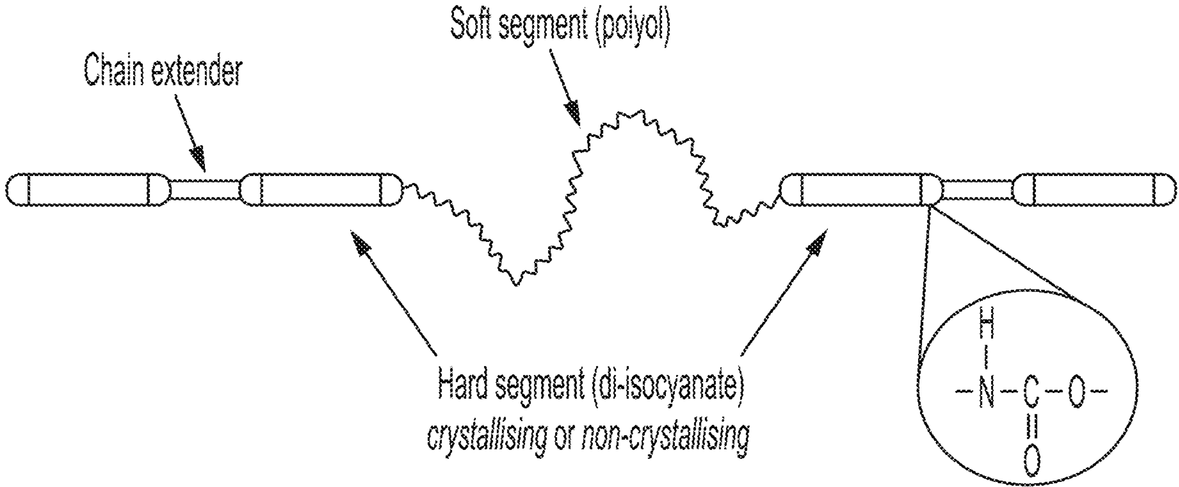
FIG. 1B illustrates an example of hard and soft segments of polyurethane in accordance with some embodiments disclosed herein.

In some embodiments, the soft segments of the TPU can include polyols. As used herein, polyols are organic compounds containing two or more hydroxyl (—OH) functional groups. Accordingly, polyols and isocyanates can be reacted together to form TPUs that can be utilized in a solid sulfide electrolyte. In some embodiments, urethane bonds can be formed from the hydroxyl groups of the polyol and the isocyanate groups of the isocyanates. Not to be bound by any particular theory, but the positively charged carbon of the isocyanate group (—N═C═O) can be attached by the nucleophilic oxygen of the polyol alcohol group while its active hydrogen is added to the negatively charged nitrogen (nucleophilic addition to C═N bond). An example of a polyurethane reaction is shown in FIG. 1A that includes isocyanate 101 reacted with polyol 102 to form TPU 103. As shown in FIG. 1A, the isocyanate can be linked to the polyol via urethane linkage 104 in the TPU. FIG. 1B illustrates examples of hard and soft segments of a polyurethane.

Figure 2A:
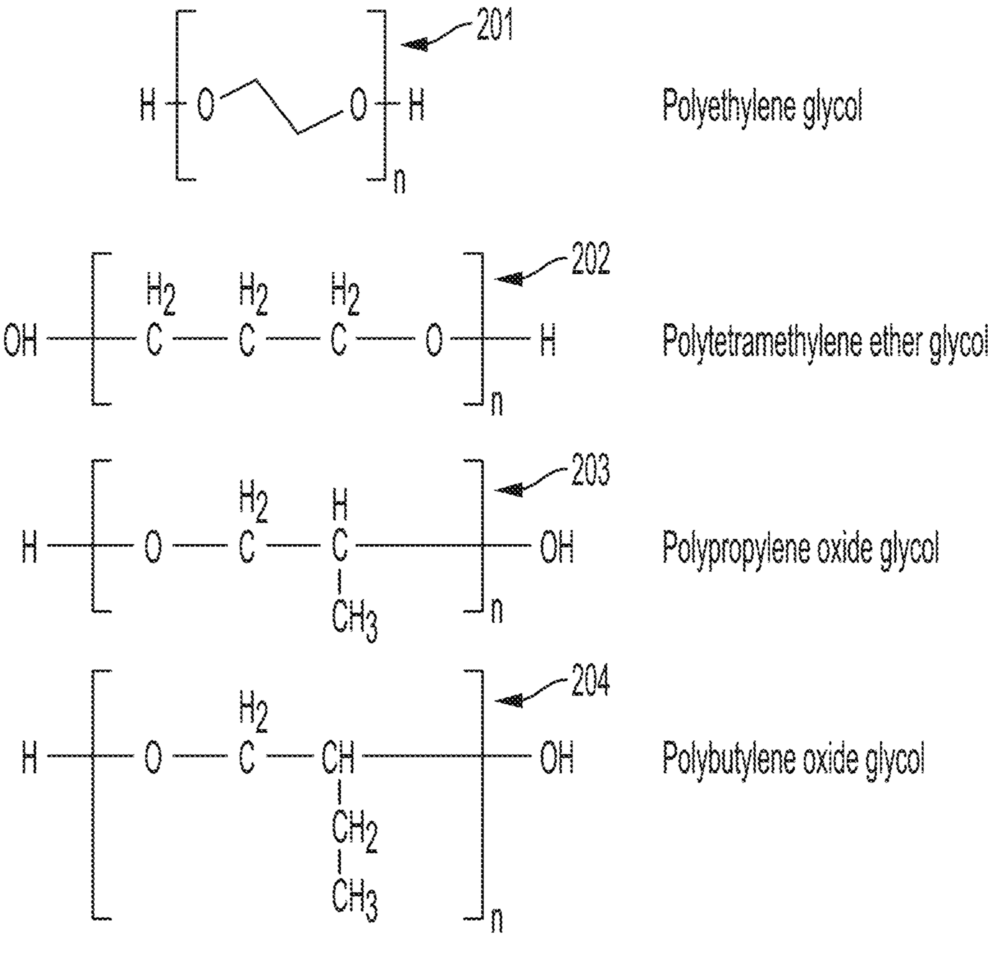
FIG. 2A illustrates examples of polyols in accordance with some embodiments disclosed herein.
Figure 2B:
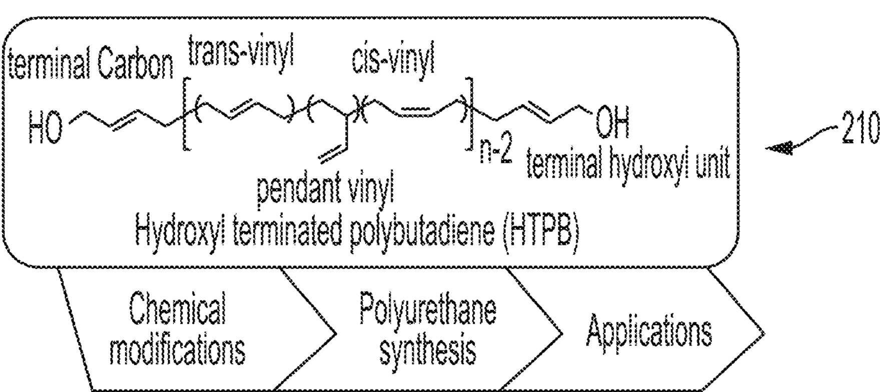
FIG. 2B illustrates additional examples of polyols in accordance with some embodiments disclosed herein.

In some embodiments, the polyol can include ether polyol, ester polyol, or combinations thereof. In some embodiments, the polyol can include diols, ether block-co-polymer diols, ester block-co-polymer diols, or combinations thereof. In some embodiments, the polyol can include polybutadiene diol, polyisoprene diol, polyether diol, polyester diol, or combinations thereof. In some embodiments, the polyol can include polyethylene glycol, polytetramethylene ether glycol, polypropylene oxide glycol, polybutylene oxide glycol, hydroxyl terminated polybutadiene (HTPB), polybutadiene, polyisoprene, PSD, or combinations thereof. FIG. 2A illustrates examples of polyethylene glycol 201, polytetramethylene ether glycol 202, polypropylene oxide glycol 203, and polybutylene oxide glycol 204. FIG. 2B illustrates additional examples of polyols 205, 206, 207, 208, 209, and 210 that can be used for the solid sulfide electrolyte synthesis disclosed herein. In some embodiments, the polyol can include lithium conducting and/or dissolving source polyols. Any one of or more of the above polyols can be used in the systems and methods described herein.

In some embodiments, more soft segments of the TPU the greater the lithium conductivity and the more hard segments the greater the mechanical properties. In some embodiments, the molecular weight of the polyol can be at least about 50 g/mol, at least about 100 g/mol, at least about 200 g/mol, at least about 250 g/mol, at least about 300 g/mol, at least about 400 g/mol, at least about 500 g/mol, at least about 750 g/mol, at least about 1000 g/mol, at least about 1500 g/mol, at least about 1750 g/mol, at least about 2000 g/mol, at least about 2225 g/mol, at least about 3000 g/mol, or at least about 4000 g/mol. In some embodiments, the molecular weight of the polyol can be at most about 10,000 g/mol, at most about 7500 g/mol, at most about 6000 g/mol, at most about 5000 g/mol, at most about 4500 g/mol, at most about 4000 g/mol, at most about 3000 g/mol, at most about 2500 g/mol, at most about 2225 g/mol, at most about 2000 g/mol, or at most about 1000 g/mol. In some embodiments, the molecular weight of the polyol can be about 10-10,000 g/mol, about 50-7500 g/mol, about 250-6000 g/mol, about 500-5000 g/mol, 1000-3000 g/mol, 1500-2500 g/mol, or about 1750-2225 g/mol.

Figure 3:
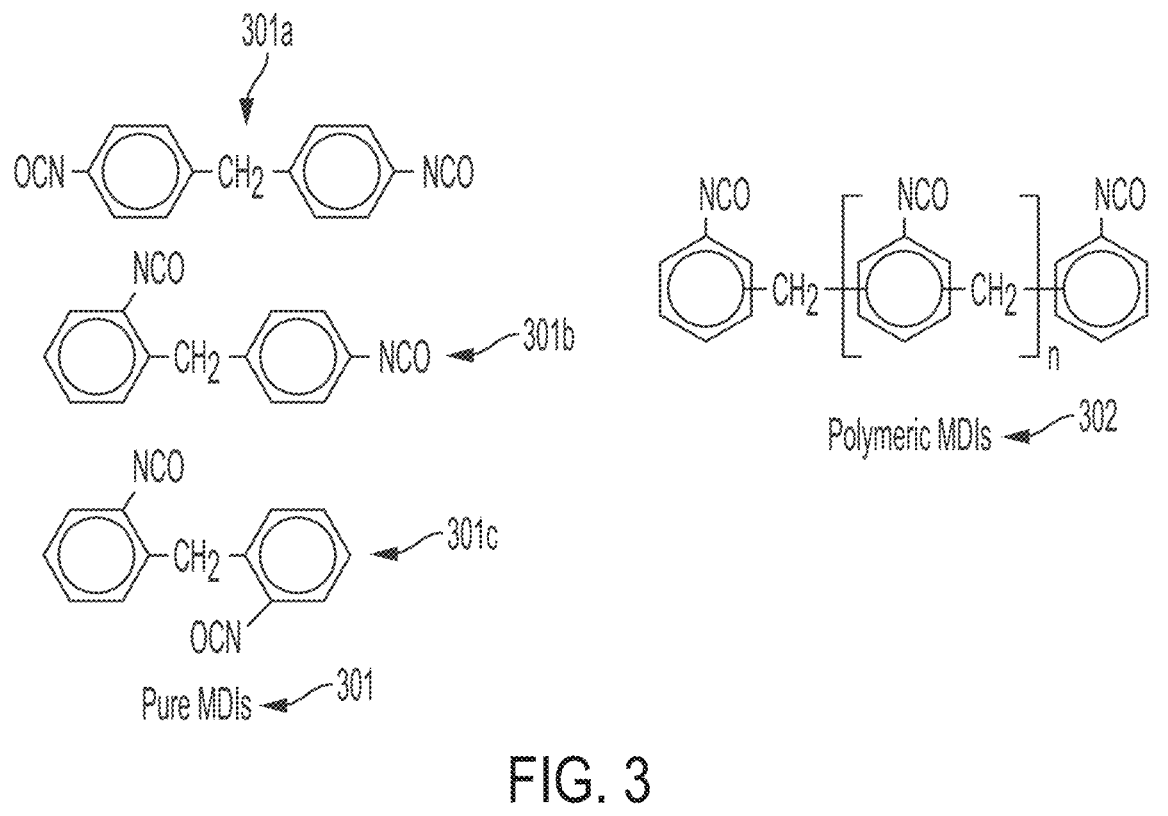
Figure 4:
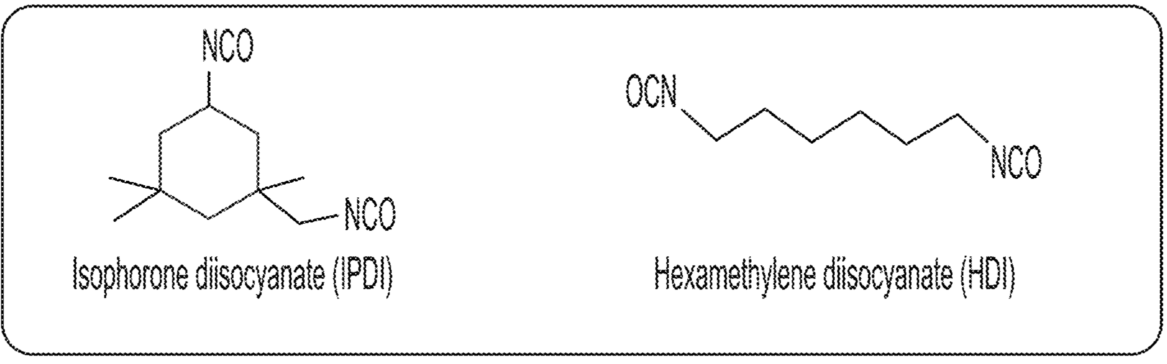
FIG. 4 illustrates additional examples of isocyanates in accordance with some embodiments disclosed herein.
Figure 4:
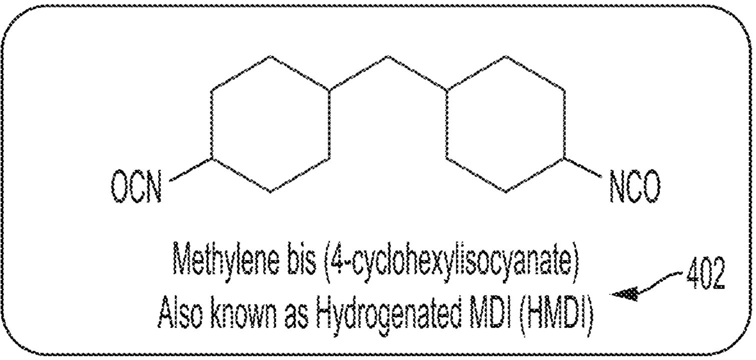

In some embodiments, the isocyanate can include a diisocyanate. In some embodiments, the isocyanate can include methylene diphenyl diisocyanates ("MDI"). In some embodiments, the MDI can be pure MDIs or polymeric MDIs. Examples of pure MDIs 301*a-c* and polymeric MDI 302 are shown in FIG. 3. In some embodiments, the isocyanate can include an aromatic isocyanate, an aliphatic isocyanate, or combinations thereof. FIG. 4 illustrates examples of aliphatic isocyanates 401 and an aliphatic isocyanate 402. FIG. 1A illustrates aromatic isocyanates 101. In some embodiments, the isocyanate can include ether isocyanates, ester isocyanates, or combinations thereof. Any one of or more of the above polyols can be used in the systems and methods described herein.

In some embodiments, the polyols and isocyanates disclosed herein can be precursors for polymer synthesis (e.g., polyurethane synthesis). In other words, the polyols can react with the isocyanates (or vice versa) to form the thermoplastic polyurethanes that can act as binders for the solid sulfide electrolytes disclosed herein. In some embodiments, this reaction can take place in an extruder. An extruder is typically used to create extruded structures. However, the methods and systems described herein can utilize extruders to synthesize polymers (e.g., TPU) in the extruder by feeding the extruder the polymer precursors (e.g., polyols and isocyanates).

In some embodiments, a polyol and an isocyanate can be fed to an extruder. In some embodiments, the polyol and/or isocyanate are in their liquid and/or solid form. In some embodiments, the extruder is a heated extruder. In some embodiments, the extruder is a twin-screw extruder. In some embodiments, the twin-screw extruder is a co-rotating twin screw extruder or counter-rotating twin screw extruder.

Figure 5:
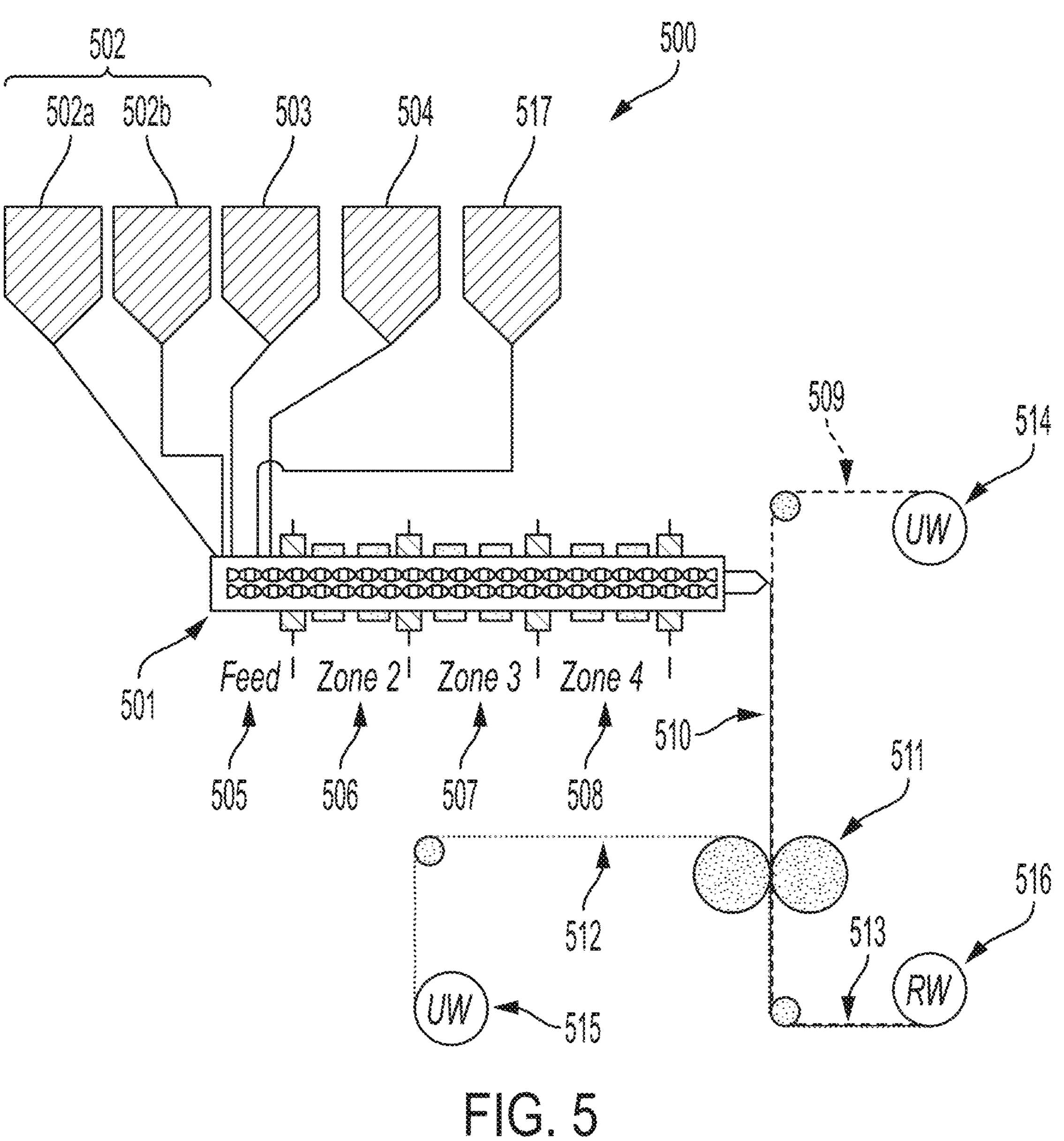
FIG. 5 illustrates an example of a system for making a solid sulfide electrolyte, lamination between Li metal anode and cathode in accordance with some embodiments disclosed herein.

FIG. 5 illustrates an example of a system 500 for making a solid sulfide electrolyte. In some embodiments, the system can include extruder 501 (e.g., heated twin-screw extruder). In some embodiments, a different combination of raw materials (e.g., polymer precursors 502 (polyols 502*a* and isocyantes 502*b*), sulfides 517, lithium salts 503, additives 504, etc.) can be fed to the extruder. The extruder can include multiple barrel sections or zones. Each barrel section or zone can represent an axial length of, for example, a number of diameters (e.g., four diameters (4D)) of the extruder. In some embodiments, the extruder can include a feed section or zone 505 and other sections or zones (506, 507, 508) that are downstream of the feed section/zone. Although the number of barrel sections/zones may vary according to different embodiments, the total extruder length should be sufficient for kneading/mixing material components to yield a blend with uniform dispersive and distributive properties.

In some embodiments, all materials fed to the extruder can be fed through the same zone, or each material can be individually fed to the extruder through separate zones, or combinations thereof. In some embodiments, all materials can be fed through a single port of the extruder, or each ingredient can be individually fed to the extruder through separate ports, or combinations thereof. As stated above, the polymer precursors 502 can be fed into the same or different zones of the extruder. In some embodiments, the polyol and isocyanate can be fed into the same zone of the extruder (e.g., feed zone) as shown in FIG. 5. In some embodiments, the polyol and isocyanate can be fed into different zones of the extruder. For example, the polyol can be fed to feed zone and the isocyanate can be fed to zone 1 downstream of the feed zone (or vice versa).

Once in the extruder, the polyol and isocyanate can react to form the polyurethane (e.g., TPU) in the extruder barrel. In some embodiments, this reaction may take place downstream of where the polymer precursors were fed into the extruder. For example, the polyol and isocyanate may be fed to the extruder in the feed zone. As the polyol and isocyanate are kneaded/mixed within the extruder, the reaction between the two to form polyurethane may take place in zone 1 downstream from the feed zone.

In some embodiments, the temperature of the extruder can be a temperature sufficient for the polyurethane reaction between polyol and isocyanate to take place. In some embodiments, the temperature of the extruder (i.e., the temperature along the length of the screw barrel of the extruder) can be such that the polyurethane (i.e., TPU) can be in its melt state. In some embodiments, a lower temperature limit for extrusion can be the melting point of the polyurethane. If the extrusion temperature drops below the melting temperature of polyurethane, then undesirable "unmelts" might appear in the extruded product (i.e., solid sulfide electrolyte) and the solid sulfide electrolyte may exhibit uneven thickness. As such, the temperature of the extruder can be selected to control the polyurethane reaction and/or the polymer melt in the extruder. In some embodiments, the temperature of the extruder (i.e., the temperature along the length of the screw barrel of the extruder) can be at least about 40° C., at least about 50° C., at least about 60° C., at least about 70° C., at least about 75° C., at least about 80° C., at least about 85° C., at least about 90° C., at least about 95° C., at least about 100° C., at least about 105° C., or at least about 110° C. In some embodiments, the temperature of the extruder can be at most about 300° C., at most about 250° C., at most about 200° C., at most about 190° C., at most about 180° C., at most about 170° C., at most about 160° C., at most about 150° C., at most about 140° C., at most about 130° C., at most about 120° C., at most about 125° C., at most about 120° C., at most about 115° C., at most about 110° C., or at most about 100° C. In some embodiments, the temperature of the extruder can be about 40-300° C., about 50-250° C., about 50-200° C., about 60-180° C., about 70-150° C., or about 80-120° C.

The amount of polyol to isocyanate fed to the extruder can impact the properties of the polyurethane formed, thereby impacting the properties (e.g., electrochemical and mechanical properties) of the final solid sulfide electrolyte. In some embodiments, the weight or volume ratio of polyol to isocyanate (polyol:isocyante) fed into the extruder is about 0.1-5:1, about 0.1-3:1, about 0.25-2:1, or about 0.5-1.5:1.

In some embodiments, the amount of polymer precursor (e.g., polyol and isocyanate) fed to the extruder is such that the polymer precursor is at most about 25 wt. %, at most about 20 wt. %, at most about 15 wt. %, at most about 10 wt. %, at most about 5 wt. %, at most about 4 wt. %, at most about 3 wt. %, at most about 2 wt. %, or at most about 1 wt. % of the total weight of all components (includes polyol, isocyanate, catalysts, and additives) fed into the extruder or in the extruder. In some embodiments, the amount of polymer precursor fed to the extruder is such that the polymer precursor is at least about 0.1 wt. %, at least about 0.5 wt. %, at least about 1 wt. %, at least about 2 wt. %, at least about 3 wt. %, at least about 4 wt. %, at least about 5 wt. %, at least about 10 wt. %, at least about 15 wt. %, or at least about 20 wt. % the total weight of all components fed into the extruder or in the extruder. In some embodiments, the amount of polymer precursor fed to the extruder is such that the polymer precursor is about 0.1-25 wt. %, at about 1-20 wt. %, about 1-15 wt. %, about 2-10 wt. %, or about 3-4 wt. % the total weight of all components fed into the extruder or in the extruder.

Figure 6:
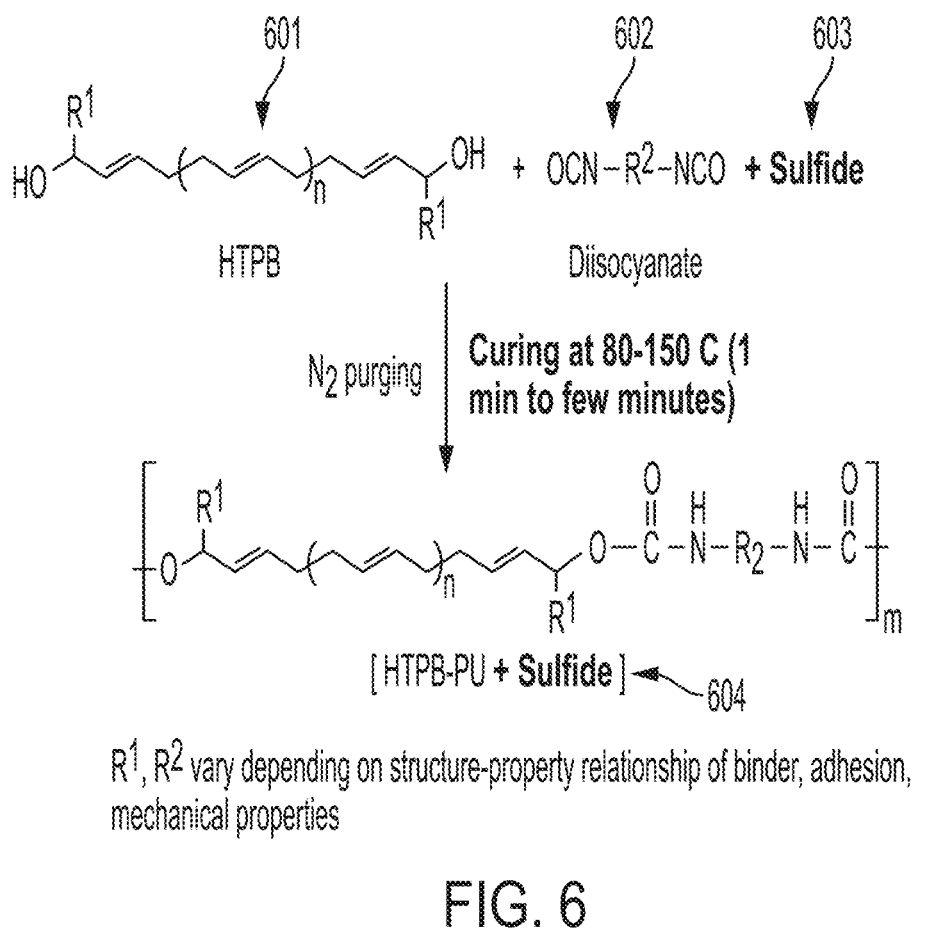

To form the solid sulfide electrolyte, sulfides can be fed to the extruder. In some embodiments, the sulfide is in a solid form. The polyurethane (e.g., TPU) can act as a binder for and/or coat the sulfide to form the solid sulfide electrolyte. In some embodiments, the polyurethane can adhere to the sulfide. In other words, the polyurethane and the sulfides can physically interact. For example, the extruder can mix/knead the polyols, isocyanates, already formed polyurethane, and sulfides in the extruder to form a sulfide-polymer composite that includes the polyurethane (e.g., TPU) and the sulfide. FIG. 6 illustrates an exemplary sulfide-polymer composite (i.e., sold sulfide electrolyte) synthesis with a polyol 601, isocyanate 602, and sulfide 603 to form the sulfide-polymer composite (i.e., sold sulfide electrolyte) 604. Specifically, during the mix/knead reaction between the polyol 601 and the isocyanate 602, sulfides can become trapped between the polymer soft chains and hard chains to form the sulfide-polymer composite.

In some embodiments, the sulfide can be fed into the extruder in the same zone as at least one of the polymer precursors. For example, the sulfide can be fed into the extruder in the same zone as the polyol and/or the isocyanate. In some embodiments, the sulfide is fed into the same zone of the extruder as only one of the polyol or isocyanate. In some embodiments, the sulfide is fed into the extruder in a different zone than the polyol and/or isocyanate. In some embodiments, the sulfide is fed into the extruder at a zone downstream of the polyol and/or isocyanate. For example, the polyol and isocyanate can be fed to the same or different zones and mixed together such that the reaction to polyurethane takes place. In a zone downstream from the feeds of the polyol and isocyanate, sulfide can be fed to the extruder. The sulfide can be kneaded/mixed with the polyol and isocyanate (and polyurethane) to form a polyurethane (e.g., TPU) binder for the sulfide. In some embodiments, the sulfide can be added to the extruder while the polyurethane is in the melt state. In some embodiments, the sulfide can be uniformly or as close to uniformly dispersed as possible. In some embodiments, sulfide dispersion can be characterized using electron microscopy (e.g., scanning electron microscopy), optical microscopy, and others. In some embodiments, the sulfide can be fed into the extruder before the polyol and/or isocyanate.

In some embodiments, the sulfide can be pre-mixed with the polyol and/or isocyanate before being fed into the extruder. In some embodiments, the sulfide can be mixed with the polyol to form a polyol/sulfide mixture and then fed into a zone of the extruder. In some embodiments, the isocyanate can be fed to the extruder in a zone before or after (or the same) where the polyol/sulfide mixture is fed. In some embodiments, the sulfide can be mixed with the isocyanate to form an isocyanate/sulfide mixture and then fed into a zone of the extruder.

In some embodiments, the sulfide is a ceramic sulfide. In some embodiments, the sulfide ceramic may have formulations of $Li_{7-a-b}PS_{6-a-b}X_aY_b$ (X=Cl, Br or I, Y=Cl, Br or I, $0<a<2$, $0<b<2$). In some embodiments, the sulfide ceramic may have formulations of $Li_{7-a-b}PS_{6-a-b-c}Z_c$XaYb (X could be one of the elements of F, Cl, Br or I, Y could be one of the elements of F, Cl, Br or I, Z could be one of the elements of O, Se, $0\leq a<2$, $0\leq b<2$, $0\leq c\leq 6$). In some embodiments, the sulfide ceramic may have formulations of $xLi_2S\text{-}yP_2S_5$ ($0<x<100$, $0<y<100$). In some embodiments, the sulfide ceramic may have formulations of $Li_{7-x}X_{1-y}P_yS_{6-z}Y_z$ (X could be at least one of elements from B, N, As, Sb, Al, Si, Ge, Ga, Sn. Y could be at least one of elements from F, Cl, Br and I. $0<x<2$, $0\leq y<1$, $0\leq z\leq 2$). In some embodiments, the sulfide ceramic may have formulations of $Li_{8-x}M_{1-x}M'_xS_{4-y}O_y$ (M=Si or Ge; M'=P, Al, Zn, Ga, Sb or V. $0<x<1.6$, $0\leq y<4$).

In some embodiments, the amount of sulfide fed to the extruder is such that the sulfide is at least about 75 wt. %, at least about 80 wt. %, at least about 85 wt. %, at least about 90 wt. %, at least about 95 wt. %, at least about 96 wt. %, at least about 97 wt. %, at least about 98 wt. %, or at least about 99 wt. % of the total weight of all components (includes polyol, isocyanate, catalysts, and additives) fed into the extruder or in the extruder. In some embodiments, the amount of sulfide fed to the extruder is such that the sulfide is at most about 99.9 wt. %, at most about 99.5 wt. %, at most about 99 wt. %, at most about 98 wt. %, at most about 97 wt. %, at most about 96 wt. %, at most about 95 wt. %, at most about 90 wt. %, at most about 85 wt. %, or at most about 80 wt. % the total weight of all components fed into the extruder or in the extruder. In some embodiments, the amount of sulfide fed to the extruder is such that the sulfide is about 75-99.9 wt. %, at about 80-99 wt. %, about 85-99 wt. %, about 90-98 wt. %, or about 96-97 wt. % the total weight of all components fed into the extruder or in the extruder.

In some embodiments, additives (such as polymer synthesis additives, extrusion additives, or solid sulfide electrolyte additives) can be fed to the extruder. In some embodiments, the additives can be manufacturing aid additives that help extrusion. In some embodiments, the additives can be ionic conductivity agents to improve ionic conductivity. In some embodiments, the additives can include succinonitrile, glutaronitrile, adiponitrile, fluoroethylene carbonate, tetraethylene glycol, solvated ionic liquids, ionic liquids with good lithium metal compatibility, or combinations thereof.

In some embodiments a catalyst for the polyurethane reaction can be fed to the extruder. In some embodiments, the additives can improve ionic conductivity and/or mechanical properties of the solid sulfide electrolyte. In some embodiments, the additives include plasticizers. In some embodiments, these additives can be fed to the extruder in any zone before, after, and/or with the polyol, isocyanate, and/or lithium salt. In some embodiments, the amount of additives fed to the extruder is such that the additives are about 5-15 wt. % the total weight of all components fed into the extruder or in the extruder.

In some embodiments, the additive can include a solvent that is compatible with the sulfide. In some embodiments, the solvents can include xylene, toluene, dibromomethane, N-methylformamide, tetrohydrofuran, ethyl propionate, acetonitrile, or combinations thereof. In some embodiments, no solvent can be fed to the extruder or the extrusion process is free from solvents. In some embodiments, an amount of solvent fed to the extruder is such that the solvent is at most about 10 wt. %, at most about 5 wt. %, at most about 4 wt. %, at most about 3 wt. %, at most about 2 wt. %, at most about 1 wt. %, or at most about 0.5 wt. % the total weight of all components fed into the extruder. In some embodiments, an amount of solvent fed to the extruder is such that the solvent is at least about 0.1 wt. %, at least about 0.5 wt. %, at least about 1 wt. %, at least about 2 wt. %, at least about 3 wt. %, at least about 4 wt. %, or at least about 5 wt. % the total weight of all components fed into the extruder.

As such, the systems and methods disclosed herein can allow for polymer binders (e.g., polyurethane) that are compatible with sulfides with no or minimum solvent. In some embodiments, the one or more additives (e.g., solvent) can be fed into the extruder in the same zone as at least one of the polymer precursors. For example, the one or more additives can be fed into the extruder in the same zone as the polyol and/or the isocyanate. In some embodiments, the one or more additives can be fed into the extruder in the same or different zone as the sulfide. In some embodiments, the one or more additives is fed into the same zone of the extruder as only one of the polyol or isocyanate. In some embodiments, the one or more additives is fed into the extruder in a different zone than the polyol and/or isocyanate. In some embodiments, the one or more additives is fed into the extruder at a zone downstream of the polyol and/or isocyanate. In some embodiments, the one or more additives can be added to the extruder while the polyurethane is in the melt state. In some embodiments, the one or more additives can be fed into the extruder before the polyol and/or isocyanate.

In some embodiments, the sulfide can be pre-mixed with the one or more additives (e.g., solvent) before being fed into the extruder. In some embodiments, the sulfide can be mixed with the one or more additives and then fed into a zone of the extruder. In some embodiments, the polyol and/or isocyanate can be fed to the extruder in a zone before or after (or the same) where the sulfide/additive(s) mixture is fed.

In some embodiments, the sulfide-polymer composite can be extruded out of the extruder (e.g., through a die) to form a solid sulfide electrolyte extruded structure. The extruded structure can be a structure with a sheet-like profile such as a film, a web, a sheet, a layer, or the like. In some embodiments, the solid sulfide electrolyte extruded structure can have a thickness of at least about 1 micron, at least about 5 microns, at least about 10 microns, at least about 15 microns, at least about 20 microns, at least about 25 microns, at least about 30 microns, at least about 40 microns, at least about 50 microns, or at least about 75 microns. In some embodiments, the solid sulfide electrolyte extruded structure can have a thickness of at most about 200 microns, at most about 150 microns, at most about 125 microns, at most about 110 microns, at most about 100 microns, at most about 75 microns, at most about 50 microns, or at most about 25 microns. In some embodiments, the solid sulfide electrolyte extruded structure can have a thickness of about 1-200 microns, about 5-150 microns, or about 15-100 microns.

In some embodiments, solid sulfide electrolyte can be extruded (as a layer 510) onto a substrate 509. In some embodiments, the substrate can be an electrode film. In some embodiments, the electrode film can include a current collector and at least one electrode layer. In some embodiments, the solid sulfide electrolyte can be extruded onto the at least one electrode layer of the electrode film. In some embodiments, the electrode film can be one or more electrode layers described herein without the current collector. In some embodiments, the electrode film can be only the current collector. In some embodiments, the electrode film can include a current collector and an electrode layer on each or both sides of the current collector. In some embodiments, the solid sulfide electrolyte can be extruded on the electrode layers on each side of the current collector. In some embodiments, the electrode layers can be different. In some embodiments, the electrode layers can be the same. In some embodiments, the current collector can be a ribbon or foil. In some embodiments, the current collector can include a metal or metal alloy. In some embodiments, the metal can be aluminum, copper, nickel, iron, lithium, titanium, stainless steel, or combinations or alloys thereof. In some embodiments, the current collector can include a carbonaceous material. In some embodiments, the current collector can be coated with carbon. For example, the current collector may be a metal that is coated with carbon (e.g., carbon-coated aluminum foil).

In some embodiments, an electrode layer can be on one or both sides of the current collector. As such, in some embodiments, the electrode film can have a corresponding structure (in order) of electrode layer, current collector, and electrode layer. In some embodiments, an electrode layer can be deposited on at least one side of the current collector via slot-die coating, microgravure coating, reverse comma coating, comma coating, physical vapor deposition, and/or extrusion coating. In some embodiments, the electrode layer can include electrode active materials, conductive carbon material, binders, and/or other additives.

In some embodiments, the electrode active materials can include cathode active materials. In some embodiments, the cathode active materials can include olivine or phosphate-based cathode active materials. In some embodiments, the cathode active materials can include over-lithiated-oxide material (OLO), nickel-based cathode materials (e.g., nickel manganese cobalt (NMC) such as NMC111, NMC523, NMC622, NMC811, NMCA, nickel cobalt aluminum oxide (NCA), and Ni9013). In some embodiments, the cathode active materials can include high-nickel content (greater than or equal to about 80% Ni) lithium transition metal oxide. Such lithium transition metal oxides can include a particulate lithium nickel manganese cobalt oxide ("LiNMC"), lithium nickel cobalt aluminum oxide ("LiNCA"), lithium nickel manganese cobalt aluminum oxide ("LiNMCA"), lithium nickel manganese cobalt oxide ("LiNMC), lithium cobalt oxide (LCO), lithium manganese oxide (LMO), lithium metal phosphates like lithium iron phosphate ("LFP"), lithium iron manganese phosphate ("LMFP"), sulfur containing cathode materials, lithium sulfide ($Li_2S$), a metal oxide material (e.g., manganese oxide (MO)), lithium polysulfides, titanium disulfide ($TiS_2$), and combinations thereof.

In some embodiments, the electrode active materials can include anode active materials. In some embodiments, the anode active materials can include graphitic carbon (e.g., ordered or disordered carbon with sp2 hybridization, artificial or natural Graphite, or blended), Li metal anode, silicon-based anode (e.g., silicon-based carbon composite anode, silicon metal, oxide, carbide, pre-lithiated), silicon-based carbon composite anode, lithium alloys (e.g., Li—Mg, Li—Al, Li—Ag alloy), lithium titanate, or combinations thereof. In some embodiments, an anode material can be formed within a current collector material. For example, an electrode can include a current collector (e.g., a copper foil) with an in situ-formed anode (e.g., Li metal) on a surface of the current collector facing the solid-state electrolyte.

In some embodiments, the conductive carbon material can include graphite, carbon black, carbon nanotubes, Super P carbon black material, Ketjen Black, Acetylene Black, SWCNT, MWCNT, carbon nanofiber, graphene, and combinations thereof.

In some embodiments, the binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE"), carboxymethylcellulose ("CMC"), agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or combinations thereof.

In some embodiments, the solid sulfide electrolyte can be chemically and electrochemically compatible with any anode material (e.g., lithium metal anode) described herein. In some embodiments, the solid sulfide electrolyte can be chemically and electrochemically compatible with any cathode material (e.g., nickel manganese cobalt (NMC) with nickel contents from about 60-90 wt. %) disclosed herein.

In some embodiments, the extruded solid sulfide electrolytes disclosed herein can have high ionic conductivity and mechanical properties. As stated above, the extruded solid sulfide electrolytes can be a polyurethane-sulfide composite. In some embodiments, the amount of sulfide is at least about 75 wt. %, at least about 80 wt. %, at least about 85 wt. %, at least about 90 wt. %, at least about 95 wt. %, at least about 96 wt. %, at least about 97 wt. %, at least about 98 wt. %, or at least about 99 wt. % of the solid sulfide electrolyte. In some embodiments, the amount of sulfide is at most about 99.9 wt. %, at most about 99.5 wt. %, at most about 99 wt. %, at most about 98 wt. %, at most about 97 wt. %, at most about 96 wt. %, at most about 95 wt. %, at most about 90 wt. %, at most about 85 wt. %, or at most about 80 wt. % of the solid sulfide electrolyte. In some embodiments, the amount of sulfide is about 75-99.9 wt. %, at about 80-99 wt. %, about 85-99 wt. %, about 90-98 wt. %, or about 96-97 wt. % of the solid sulfide electrolyte. In some embodiments, an amount of sulfide can be fed to the extruder such that the amount of sulfide in the extruded solid sulfide electrolyte is any of the above.

As explained above, the polyurethane (e.g., TPU) of the solid sulfide electrolyte can be made up of hard segments and soft segments. The hard segments can be any of the hard segments disclosed herein and the soft segments can be any of the soft segments disclosed herein. In some embodiments, the hard segments of the polyurethane (e.g., TPU) can include isocyanates. In some embodiments, the soft segments of the polyurethane (e.g., TPU) can include polyols. In some embodiments, the polyol can include a reacted polyol. In some embodiments, the polyol can include ether polyol, ester polyol, or combinations thereof. In some embodiments, the polyol can include ether block-co-polymer diols, ester block-co-polymer diols, or combinations thereof. In some embodiments, the polyol can include polybutadiene diol, polyisoprene diol, polyether diol, polyester diol, or combinations thereof. In some embodiments, the polyol can include polyethylene glycol, polytetramethylene ether glycol, polypropylene oxide glycol, polybutylene oxide glycol, or combinations thereof. In some embodiments, the molecular weight of the polyol can be at least about 50 g/mol, at least about 100 g/mol, at least about 200 g/mol, at least about 250 g/mol, at least about 300 g/mol, at least about 400 g/mol, at least about 500 g/mol, at least about 750 g/mol, at least about 1000 g/mol, at least about 2000 g/mol, at least about 3000 g/mol, or at least about 4000 g/mol. In some embodiments, the molecular weight of the polyol can be at most about 10,000 g/mol, at most about 7500 g/mol, at most about 6000 g/mol, at most about 5000 g/mol, at most about 4500 g/mol, at most about 4000 g/mol, at most about 3000 g/mol, at most about 2000 g/mol, or at most about 1000 g/mol. In some embodiments, the molecular weight of the polyol can be about 10-10,000 g/mol, about 50-7500 g/mol, about 250-6000 g/mol, or about 500-5000 g/mol. In some embodiments, the isocyanate can include a diisocyanate. In some embodiments, the isocyanate can include methylene diphenyl diisocyanates ("MDI"). In some embodiments, the MDI can be pure MDIs or polymeric MDIs. In some embodiments, the isocyanate can include an aromatic isocyanate, an aliphatic isocyanate, or combinations thereof. In some embodiments, the isocyanate can include ether isocyanates, ester isocyanates, or combinations thereof.

In some embodiments, the amount of polyurethane (e.g., TPU) is at most about 25 wt. %, at most about 20 wt. %, at most about 15 wt. %, at most about 10 wt. %, at most about 5 wt. %, at most about 4 wt. %, at most about 3 wt. %, at most about 2 wt. %, or at most about 1 wt. % of the solid sulfide electrolyte. In some embodiments, the amount polyurethane is at least about 0.1 wt. %, at least about 0.5 wt. %, at least about 1 wt. %, at least about 2 wt. %, at least about 3 wt. %, at least about 4 wt. %, at least about 5 wt. %, at least about 10 wt. %, at least about 15 wt. %, or at least about 20 wt. % of the solid sulfide electrolyte. In some embodiments, the amount of polyurethane is about 0.1-25 wt. %, at about 1-20 wt. %, about 1-15 wt. %, about 2-10 wt. %, or about 3-4 wt. % of the solid sulfide electrolyte. In some embodiments, an amount of polymer precursors (e.g., polyol and isocyanates) can be fed to the extruder such that the amount of polyurethane (e.g., TPU) in the extruded solid sulfide electrolyte is any of the above.

In some embodiments, the solid sulfide electrolyte can have an ionic conductivity of about $10^{-5}$ to $10^{-2}$ S/cm or about $10^{-4}$ to $10^{-3}$ S/cm at 20-25° C. In some embodiments, the solid sulfide electrolyte can have an ionic conductivity of about $10^{-4}$ to $10^{-2}$ S/cm or about $10^{-3}$ S/cm at 50° C. In some embodiments, the solid sulfide electrolyte can have an ionic conductivity of about $10^{-5}$ to $10^{-3}$ S/cm or about $10^{-4}$ S/cm at −20° C. The Ionic conductivity of the solid state sulfide electrolyte films at 25° C. vary from 0.6 mS/cm to 0.1 mS/cm with SSE:Binder ratio from 98:2 to 95:5 respectively.

In some embodiments, the solid sulfide electrolyte has a storage modulus of about 1-100 MPa, about 5-75 MPa, about 5-50 MPa, or about $10^{-40}$ MPa at 20-25° C. Storage modulus is measured with dynamic mechanical analysis (DMA) in tension mode.

In some embodiments, the solid sulfide electrolyte can have a glass transition temperature of less than about 0° C., less than about −10° C., less than about −20° C., or less than about −30° C. Glass transition temperature is measured with differential scanning calorimetry (DSC).

In some embodiments, the solid sulfide electrolyte has an interfacial resistance with a Li/Li cell of less than about 300 ohms/cm$^2$, less than about 250 ohms/cm$^2$, less than about 200 ohms/cm$^2$, less than about 180 ohms/cm$^2$, less than about 175 ohms/cm$^2$, less than about 150 ohms/cm$^2$, less than about 125 ohms/cm$^2$, less than about 100 ohms/cm$^2$, less than about 75 ohms/cm$^2$, or less than about 50 ohms/cm$^2$. In some embodiments, the solid sulfide electrolyte has an interfacial resistance with a Li/NMC (nickel, manganese, cobalt) cell of less than about 300 ohms/cm$^2$, less than about 250 ohms/cm$^2$, less than about 200 ohms/cm$^2$, less than about 180 ohms/cm$^2$, less than about 175 ohms/cm$^2$, less than about 150 ohms/cm$^2$, less than about 125 ohms/cm$^2$, less than about 100 ohms/cm$^2$, less than about 80 ohms/cm$^2$, less than about 75 ohms/cm$^2$, or less than about 50 ohms/cm$^2$. These tests can be conducted in a coin cell with the following set up: Li metal/sulfide electrolyte/NMC cathode or Li metal/sulfide electrolyte/Li metal. The measurements were performed with electrochemical impedance spectroscopy.

In some embodiments, the solid sulfide electrolyte has an electrochemical oxidation stability window that is greater than about 2.5V, greater than about 3V, greater than about 3.5V, greater than about 4V, or greater than about 4.3V. Electrochemical stability window (ESW) measurements were using stainless steel as working electrode and Li metal as electrode. The technique used for measurements was linear sweep voltammetry and 5 uA/cm$^2$ threshold current was taken as cut off value.

In some embodiments, the solid sulfide electrolyte has cycle life greater than 200 cycles, greater than 100 cycles, or greater than 50 cycles in NMC/Li cell. The interfacial resistance of the solid state electrolyte with Li/NMC cell after cycling of less than about 300 ohms/cm$^2$, less than about 250 ohms/cm$^2$, less than about 200 ohms/cm$^2$, less than about 180 ohms/cm$^2$, less than about 175 ohms/cm$^2$, less than about 150 ohms/cm$^2$, less than about 125 ohms/cm$^2$, less than about 100 ohms/cm$^2$, less than about 80 ohms/cm$^2$, less than about 75 ohms/cm$^2$, or less than about 50 ohms/cm$^2$. These tests can be conducted in a coin cell with the following set up: Li metal/sulfide electrolyte/NMC cathode or Li metal/sulfide electrolyte/Li metal. The measurements were performed with electrochemical impedance spectroscopy.

In some embodiments, the polymer precursors (e.g., polyols and isocyanates), the sulfides, and the additives can be adjusted/optimized such that the extruded solid sulfide electrolyte can retain more than about 50% capacity, more than about 60% capacity, or more than about 70% capacity (500-1000 cycles) with a lithium metal anode and a transition metal cathode (e.g., NMC, NCA, LMNO, LFP) cathode.

In some embodiments, system 500 for making a solid sulfide electrolyte can include calender 511 (or laminator). In some embodiments, the calender can include a plurality of rollers (e.g., pressure rollers, hard rollers) to apply pressure to both sides of a substrate, film, sheet, etc. that it receives. In some embodiments, the calender can be used to assemble and densify components of a battery. In some embodiments, the calender can be configured to bond two substrates, films, sheets, layers, etc. together. In some embodiments, the calender can be configured to receive a substrate that has a solid sulfide electrolyte extruded on one or more sides of the substrate.

In some embodiments, the calender can be configured to bond at least one surface of the substrate to a surface of the extruded solid sulfide electrolyte to form a densified electrode film. For example, the calender can exert a sufficiently high pressure so that a surface or surfaces of the substrate can bond or densify the extruded solid sulfide electrolyte resulting in minimal voids or gaps. Such voids or gaps should be minimized because they can potentially decrease the battery cell life. In some embodiments, the extruded solid sulfide electrolyte can be bonded to the at least one surface of the substrate during calendering (or laminating). For example, the extruded solid sulfide electrolyte can be bonded to the at least one electrode layer of the substrate.

In some embodiments, the calender can be configured to receive a second substrate 512 (with or without a solid sulfide electrolyte extruded on at least one surface). In some embodiments, the second substrate can be any of the substrates described above. For example, in some embodiments, a solid sulfide electrolyte can be extruded on a side of a first substrate (e.g., an anode such as lithium metal). The first substrate with the solid sulfide electrolyte can be received by the calender. In addition, a second substrate (e.g., a cathode) can be received by the calender such that the solid sulfide electrolyte is sandwiched between the two substrates before entering the calender. As such, in some embodiments, the calender can be configured to bond a surface of a second electrode to a surface of the extruded solid sulfide electrolyte opposite the first substrate to form a densified electrode film 513. In other words, the calender can be configured to bond the extruded solid sulfide electrolyte between two substrates. In some embodiments, the substrate or substrates with the solid sulfide electrolyte can exit the calender bonded together as a densified electrode film.

In some embodiments, the substrates/films/layers can exit the calender bonded together as a densified electrode film without the need for additional materials or bonding agents. The calender is not limited for use in electrode or solid sulfide electrolyte calendering. In some embodiments, the calender can be configured to assemble other components of a battery cell such as a cathode, separator, electrolyte layer, and/or anode, for example.

In some embodiments, the systems described herein can have one or more substrate unwinders configured to unwind a substrate. In some embodiments, the calender can be configured to receive the unwound substrate from the at least one substrate unwinder. The number and arrangement of the unwinders can depend on the desired design and geometry of the resulting battery cell component. For example, as shown in FIG. 5, there can be two substrate unwinders 514 and 515 arranged such that the resulting densified electrode film 513 can have a solid sulfide electrolyte layer 510 sandwiched between substrate layers 509 and 512. For example, the solid sulfide electrolyte layer can be sandwiched between an anode layer and a cathode layer. As shown in FIG. 5, after passing through the calender, substrate layers can be bonded to a first and second side of the solid sulfide electrolyte to sandwich the solid sulfide electrolyte between the first and second substrates. In some embodiments, the solid sulfide electrolyte can already be bonded to a side of a first substrate prior to calendering (e.g., from the extrusion process). As such, in some embodiments, the calendering process can further bond (further densify) the first substrate to the extruded solid sulfide electrolyte and/or can bond the side of the solid sulfide electrolyte opposite the first substrate to a second substrate.

In some embodiments, the substrates can have a release or interleaf film/layer on one side of the substrate. In some embodiments, the release or interleaf film/layer can help prevent components of the substrate (e.g., electrode layers) from adhering to one another during storage and/or protect the components of the substrate. In some embodiments, the release or interleaf film/layer can be removed from the substrate prior to calendering. In some embodiments, the release or interleaf layer can be removed/separated from a substrate by the pressure of the calender.

In some embodiments, densified electrode film can be sent to a rewinder 516 configured to wind the densified electrode film into a roll for storage. In some embodiments, a release or interleaf layer can be added to one or more sides of the densified electrode film after calendering. For example, in some embodiments, a release or interleaf film/layer can be added to a side of the solid sulfide electrolyte opposite the first substrate and/or a release or interleaf film/layer can be added to a side of the first substrate opposite the solid sulfide electrolyte. In some embodiments, a release or interleaf film/layer can be added to a side of a second substrate opposite the solid sulfide electrolyte layer.

EXAMPLES

Figure 15:
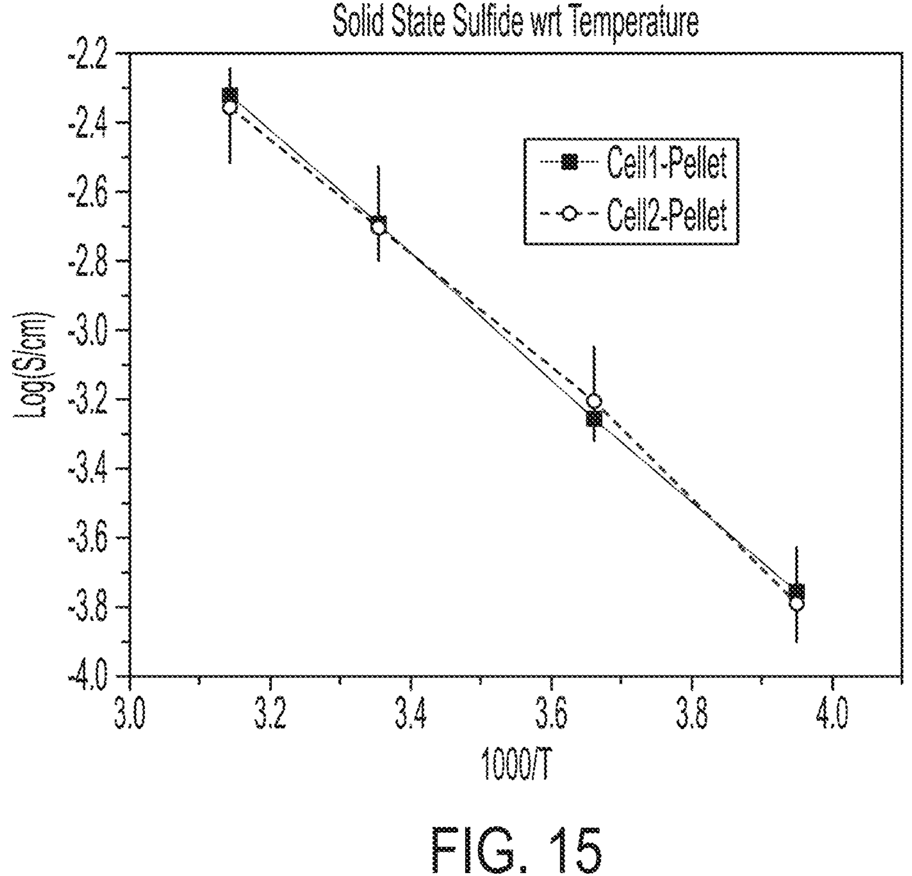
FIG. 15 illustrates ionic conductivity of a solid sulfide electrolyte with no TPU in accordance with some embodiments disclosed herein.
Figure 16:
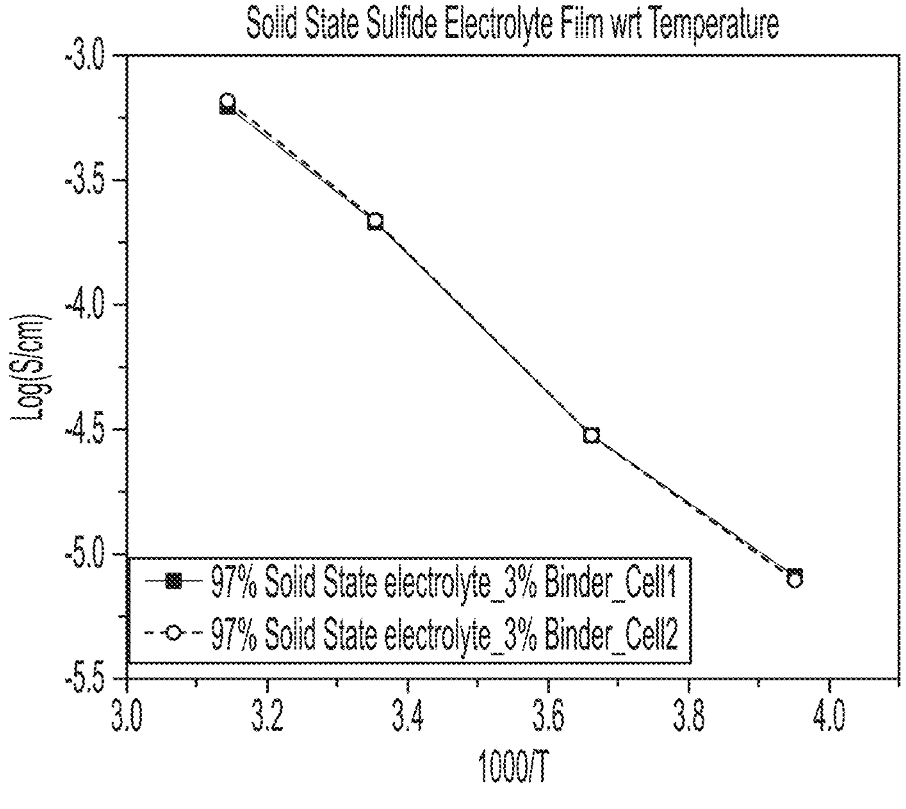
FIG. 16 illustrates ionic conductivity of a solid sulfide electrolyte with 97% sulfide and 3% TPU in accordance with some embodiments disclosed herein.

A solid state electrolyte made of 100% sulfide (SSE) with no polymer and a solid sulfide electrolyte made by the processes disclosed herein that had 97 wt. % sulfide and 3 wt. % polymer (e.g., TPU) were tested for ionic conductivity. The temperature dependent ionic conductivity of a 100% sulfide solid state electrolyte with no polymer is shown in FIG. 15 and that of a solid sulfide electrolyte film with 97% sulfide and 3% TPU polymer binder is shown in FIG. 16. Ionic conductivity of sulfide electrolytes was measured with electrochemical impedance spectroscopy with sulfide electrolyte sandwiched between stainless steel blocking electrodes under certain pressure.

Battery Cells, Battery Modules, Battery Packs, and Electric Vehicle Systems

After the solid sulfide electrolyte has been created such as by extruded on a substrate (e.g., an electrode film (anode)) and/or calendered with another substrate (e.g., another electrode film (cathode)), it can be inserted into a battery cell to form a solid-state battery, which can be used as an electrical energy source. For example, the solid sulfide electrolytes disclosed herein can be an electrolyte layer used in a battery cell.

Reference will now be made to implementations and embodiments of various aspects and variations of battery cells, battery modules, battery packs, and the methods of making such battery cells, battery modules, and battery packs. Although several exemplary variations of the battery cells, modules, packs, and methods of making them are described herein, other variations of the battery cells, modules, packs and methods may include aspects of the battery cells, modules, packs and methods described herein combined in any suitable manner having combinations of all or some of the aspects described. In addition, any part of or any of the electrodes, densified electrodes, components, systems, methods, apparatuses, devices, compositions, and/or electrolytes, described herein can be implemented into the battery cells, battery modules, battery packs, and methods of making these battery cells, battery modules, and battery packs.

Figure 7:
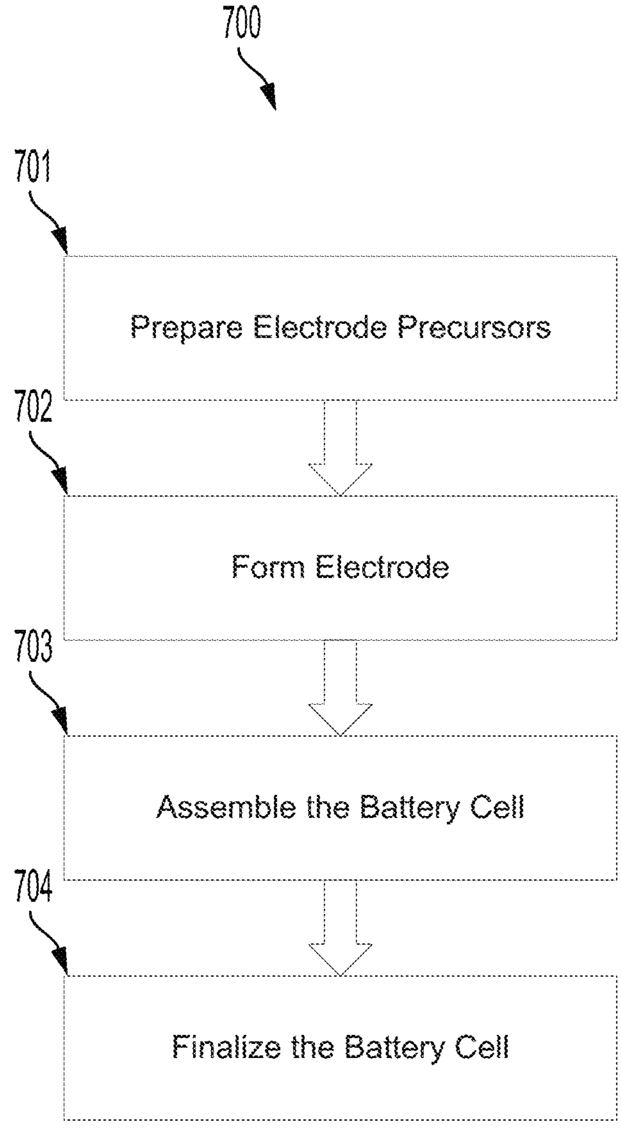
FIG. 7 illustrates a flow chart for a typical battery cell manufacturing process in accordance with some embodiments disclosed herein.

FIG. 7 illustrates a flow chart for a typical battery cell manufacturing process 700. These steps are not exhaustive and other battery cell manufacturing processes can include additional steps or only a subset of these steps. At step 701, the electrode precursors (e.g., binder, active material, conductive carbon additive) can be prepared. In some embodiments, this step can include mixing electrode materials (e.g., active materials) with additional components (e.g., binders, solvents, conductive additives, etc.) to form an electrode slurry. In some embodiment, this step can include synthesizing the electrode materials themselves.

At step 702, the electrode can be formed. In some embodiments, this step can include coating an electrode slurry on a current collector. In some embodiments, the electrode or electrode layer can include electrode active materials, conductive carbon material, binders, and/or other additives.

In some embodiments, the electrode active materials can include cathode active materials. In some embodiments, the cathode active materials can include olivine or phosphate-based cathode active materials. In some embodiments, the cathode active materials can include over-lithiated-oxide material (OLO), nickel-based cathode materials (e.g., nickel manganese cobalt (NMC) such as NMC111, NMC523, NMC622, NMC811, NMCA, nickel cobalt aluminum oxide (NCA), and Ni9013). In some embodiments, the cathode active materials can include high-nickel content (greater than or equal to about 80% Ni) lithium transition metal oxide. Such lithium transition metal oxides can include a particulate lithium nickel manganese cobalt oxide ("LiNMC"), lithium nickel cobalt aluminum oxide ("LiNCA"), lithium nickel manganese cobalt aluminum oxide ("LiNMCA"), lithium nickel manganese cobalt oxide ("LiNMC), lithium cobalt oxide (LCO), lithium manganese oxide (LMO), lithium metal phosphates like lithium iron phosphate ("LFP"), lithium iron manganese phosphate ("LMFP"), sulfur containing cathode materials, lithium sulfide ($Li_2S$), a metal oxide material (e.g., manganese oxide (MO)), lithium polysulfides, titanium disulfide ($TiS_2$), and combinations thereof.

In some embodiments, the electrode active materials can include anode active materials. In some embodiments, the anode active materials can include graphitic carbon (e.g., ordered or disordered carbon with sp2 hybridization, artificial or natural Graphite, or blended), Li metal anode, silicon-based anode (e.g., silicon-based carbon composite anode, silicon metal, oxide, carbide, pre-lithiated), silicon-based carbon composite anode, lithium alloys (e.g., Li—Mg, Li—Al, Li—Ag alloy), lithium titanate, or combinations thereof. In some embodiments, an anode material can be formed within a current collector material. For example, an electrode can include a current collector (e.g., a copper foil) with an in situ-formed anode (e.g., Li metal) on a surface of the current collector facing the solid-state electrolyte. In such examples, the assembled cell may not comprise an anode active material in an uncharged state.

In some embodiments, the conductive carbon material can include graphite, carbon black, carbon nanotubes, Super P carbon black material, Ketjen Black, Acetylene Black, SWCNT, MWCNT, carbon nanofiber, graphene, and combinations thereof.

In some embodiments, the binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE"), carboxymethylcellulose ("CMC"), agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or combinations thereof.

After coating, the coated current collector can be dried to evaporate any solvent. In some embodiments, this step can include calendering the coated current collectors. Calendering can adjust the physical properties (e.g., bonding, conductivity, density, porosity, etc.) of the electrodes. In some embodiments, the electrode can then be sized via a slitting and/or notching machine to cut the electrode into the proper size and/or shape.

In some embodiments, the electrolyte material can include a solid electrolyte material such as the solid sulfide electrolytes disclosed herein that can conduct ions. For example, the solid electrolyte layer can conduct ions without receiving a separate liquid electrolyte material. In some embodiments, solid electrolyte materials of the solid electrolyte layer can include the solid sulfide electrolytes disclosed herein.

At step 703, the battery cell can be assembled. After the electrodes and/or electrolytes have been prepared, a battery cell can be assembled/prepared. In this step, the an electrolyte layer can be assembled between the anode and cathode layers to form the internal structure of a battery cell. As disclosed herein, in some embodiments, the electrolyte layer can be assembled between the anode and cathode using the extruder and the calender. For example, the solid sulfide electrolyte layer can be extruded on an anode and then a cathode can be bonded to the solid sulfide electrolyte layer opposite the anode via calendering.

In some embodiments, the electrolyte material can be disposed in the battery cell to separate an anode and a cathode from each other and to facilitate transfer of lithium ions between the anode and cathode. In some embodiments, the electrolyte layer can transfer cations (e.g., Li13 cations) from an anode to a cathode during discharge of the battery cell and can transfer ions from a cathode to an anode during charging of the battery cell. In some embodiments, the electrolyte material can support electrochemical reactions to store or provide electric power for the battery cell by allowing for the conduction of ions between a cathode and an anode. The various layers (electrodes, separators, and/or electrolytes) of a battery cell can be assembled by a winding method such as a round winding or prismatic/flat winding, a stacking method, or a z-folding method.

The assembled cell structure can then be inserted into a cell housing which is then partially or completed sealed. In addition, the assembled structure can be connected to terminals and/or cell tabs (via a welding process).

Battery cells can have a variety of form factors, shapes, or sizes. For example, battery cells (and their housings/casings) can have a cylindrical, rectangular, square, cubic, flat, or prismatic form factor, among others. There are four main types of battery cells: (1) button or coin cells; (2) cylindrical cells; (3) prismatic cells; and (4) pouch cells. Battery cells can be assembled, for example, by inserting a winding and/or stacked electrode roll (e.g., a jellyroll) into a battery cell casing or housing. In some embodiments, the winded or stacked electrode roll can include the electrolyte material. In some embodiments, the electrolyte material can be inserted in the battery casing or housing separate from the electrode roll.

Figure 8:
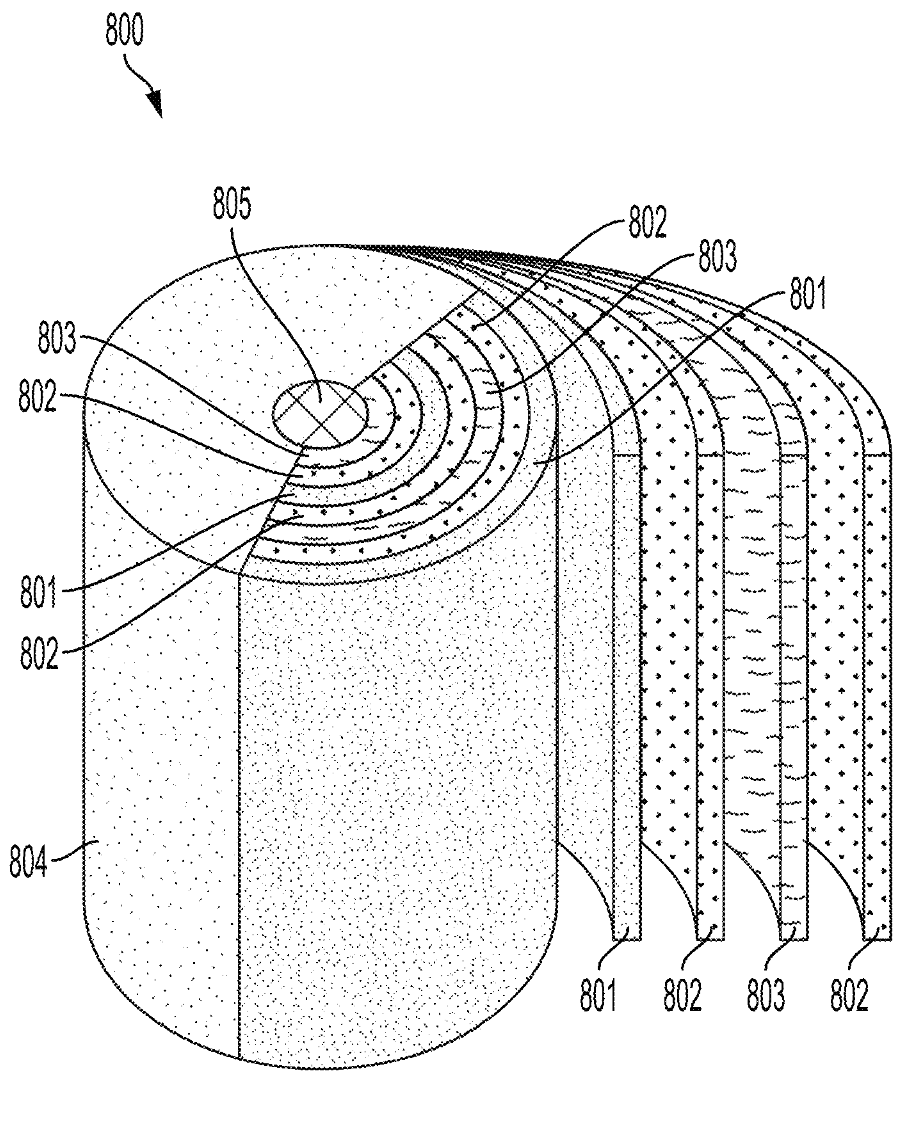
FIG. 8 depicts an illustrative example of a cross sectional view of a cylindrical battery cell in accordance with some embodiments disclosed herein.

FIG. 8 depicts an illustrative example of a cross sectional view of a cylindrical battery cell 800. The cylindrical battery cell can include layers (e.g., sheet-like layers) of anode layers 801, electrolyte layers 802, and cathode layers 803. A battery cell can include at least one anode layer, which can be disposed within the cavity of the housing/casing. The battery cell can also include at least one cathode layer. The at least one cathode layer can also be disposed within the housing/casing. In some embodiments, when the battery cell is discharging (i.e., providing electric current), the at least one anode layer releases ions (e.g., lithium ions) to the at least one cathode layer generating a flow of electrons from one side to the other. Conversely, in some embodiments, when the battery cell is charging, the at least one cathode layer can release ions and the at least one anode layer can receive these ions.

These layers (cathode, anode, electrolyte layers) can be sandwiched, rolled up, and/or packed into a cavity of a cylinder-shaped casing 804 (e.g., a metal can). The casings/housings can be rigid such as those made from metallic or hard-plastic, for example. In some embodiments, an electrolyte layer 802 can be arranged between an anode layer 801 and a cathode layer 803 to separate the anode layer 801 and the cathode layer 803. In some embodiments, the layers in the battery cell can alternate such that an electrolyte layer separates an anode layer from a cathode layer. The electrolyte layer 802 can prevent contact between the anode and cathode layers while facilitating ion (e.g., lithium ions) transport in the cell. The battery cell can also include at least one terminal 805. The at least one terminal can be electrical contacts used to connect a load or charger to a battery cell. In some embodiments, electrical connections with at least some of the electrolyte material can be formed at the at least one terminal. For example, the terminal can be made of an electrically conductive material to carry electrical current from the battery cell to an electrical load, such as a component or system of an electric vehicle as discussed further herein.

Figure 9:
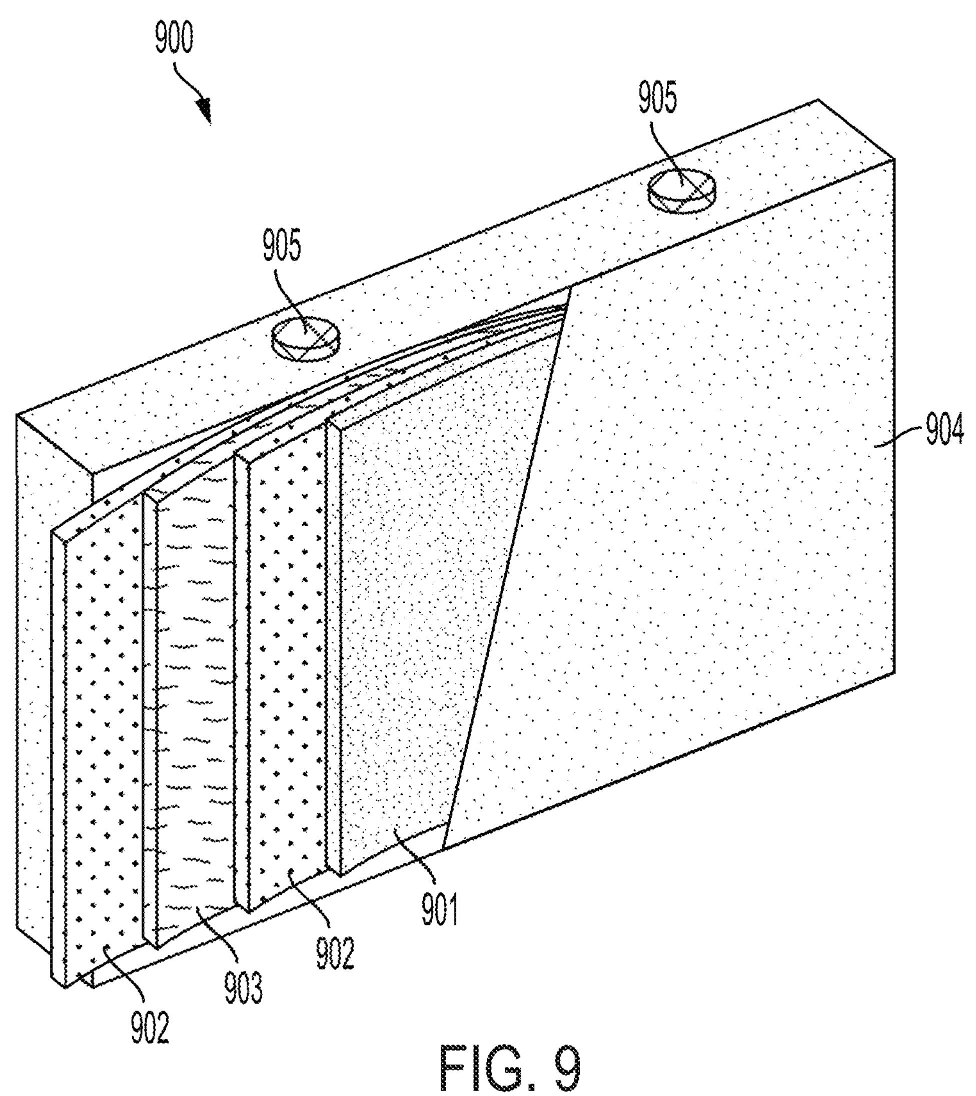
FIG. 9 depicts an illustrative example of a cross sectional view of a prismatic battery cell in accordance with some embodiments disclosed herein.

FIG. 9 depicts an illustrative example of a cross sectional view of a prismatic battery cell 900. The prismatic battery cell can include layers (e.g., sheet-like layers) of anode layers 801, electrolyte layers 802, and cathode layers 803. Similar to the cylindrical battery cell, the layers of a prismatic battery cell can be sandwiched, rolled, and/or pressed to fit into cubic or rectangular cuboid (e.g., hyperrectangle) shaped casing/housing 804. In some embodiments, the layers can be assembled by layer stacking rather than jelly rolling. In some embodiments, the casing or housing can be rigid such as those made from a metal and/or hard-plastic. In some embodiments, the prismatic battery cell 900 can include more than one terminal 805. In some embodiments, one of these terminals can be the positive terminal and the other a negative terminal. These terminals can be used to connect a load or charger to the battery cell.

Figure 10:
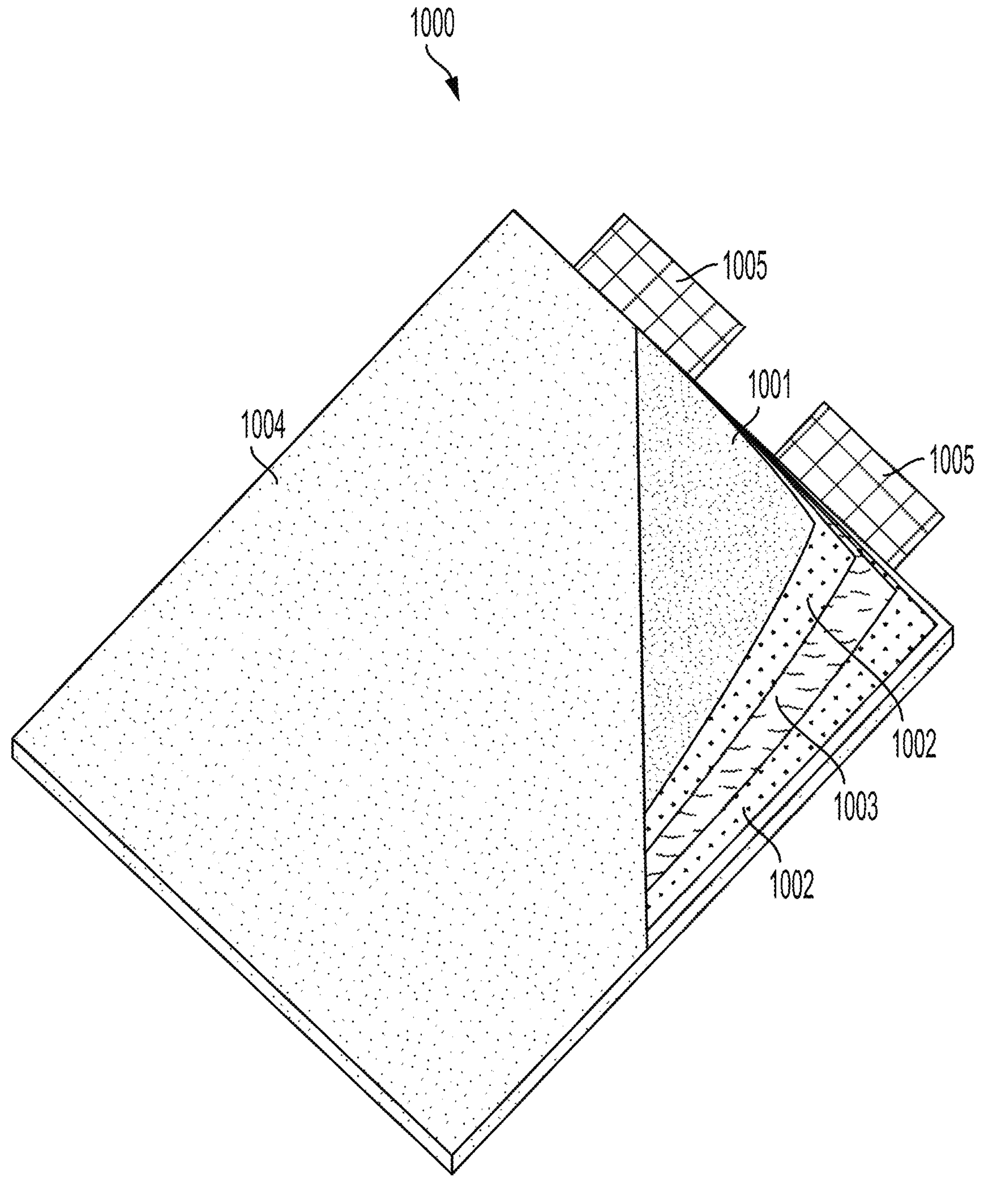
FIG. 10 depicts an illustrative example of a cross section view of a pouch battery cell in accordance with some embodiments disclosed herein.

FIG. 10 depicts an illustrative example of a cross section view of a pouch battery cell 1000. The pouch battery cells do not have a rigid enclosure and instead use a flexible material for the casing/housing 804. This flexible material can be, for example, a sealed flexible foil. The pouch battery cell can include layers (e.g., sheet-like layers) of anode layers 801, electrolyte layers 802, and cathode layers 803. In some embodiments, these layers are stacked in the casing/housing. In some embodiments, the pouch battery cell 1000 can include more than one terminal 805. In some embodiments, one of these terminals can be the positive terminal and the other the negative terminal. These terminals can be used to connect a load or charger to the battery cell.

The casings/housings of battery cells can include one or more materials with various electrical conductivity or thermal conductivity, or a combination thereof. In some embodiments, the electrically conductive and thermally conductive material for the casing/housing of the battery cell can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. In some embodiments, the electrically conductive and thermally conductive material for the housing of the battery cell can include a ceramic material (e.g., silicon nitride, silicon carbide, titanium carbide, zirconium dioxide, beryllium oxide, and among others) and/or a thermoplastic material (e.g., polyethylene, polypropylene, polystyrene, polyvinyl chloride, or nylon), among others.

At step 704, the battery cell can be finalized. In some embodiments, this step includes the formation process wherein the first charging and discharging process for the battery cell takes place. In some embodiments, this initial charge and discharge can form a solid electrolyte interface between the electrolyte and the electrodes. In some embodiments, this step may cause some of the cells to produce gas which can be removed in a degassing process from the battery cell. In some embodiments, this step includes aging the battery cell. Aging can include monitoring cell characteristics and performance over a fixed period of time. In some embodiments, this step can also include testing the cells in an end-of-line (EOL) test rig. The EOL testing can include discharging the battery cells to the shipping state of charge, pulse testing, testing internal resistance measurements, testing OCV, testing for leakage, and/or optically inspecting the battery cells for deficiencies.

Figure 11:
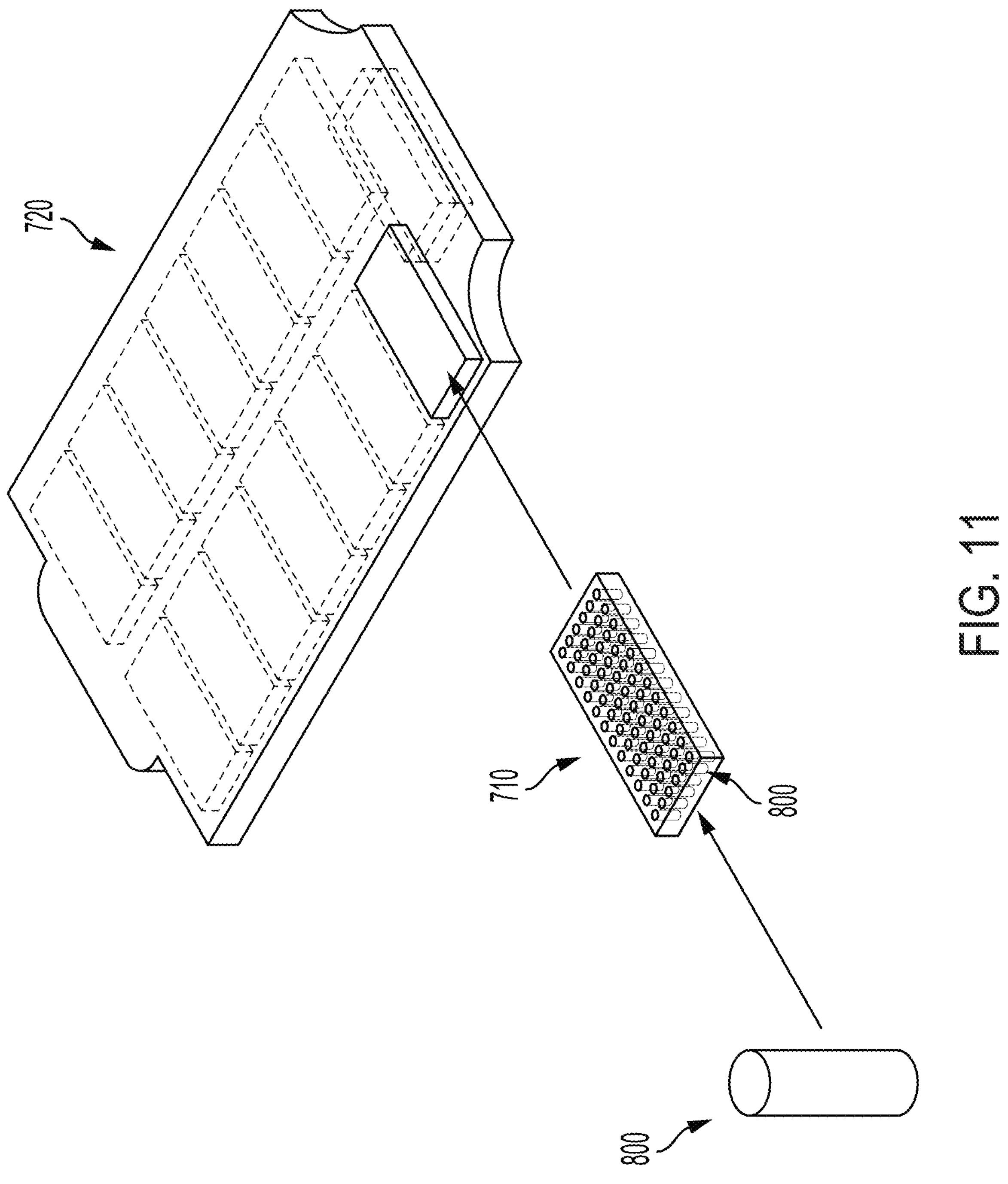
FIG. 11 illustrates cylindrical battery cells being inserted into a frame to form a battery module and pack in accordance with some embodiments disclosed herein.
Figure 12:
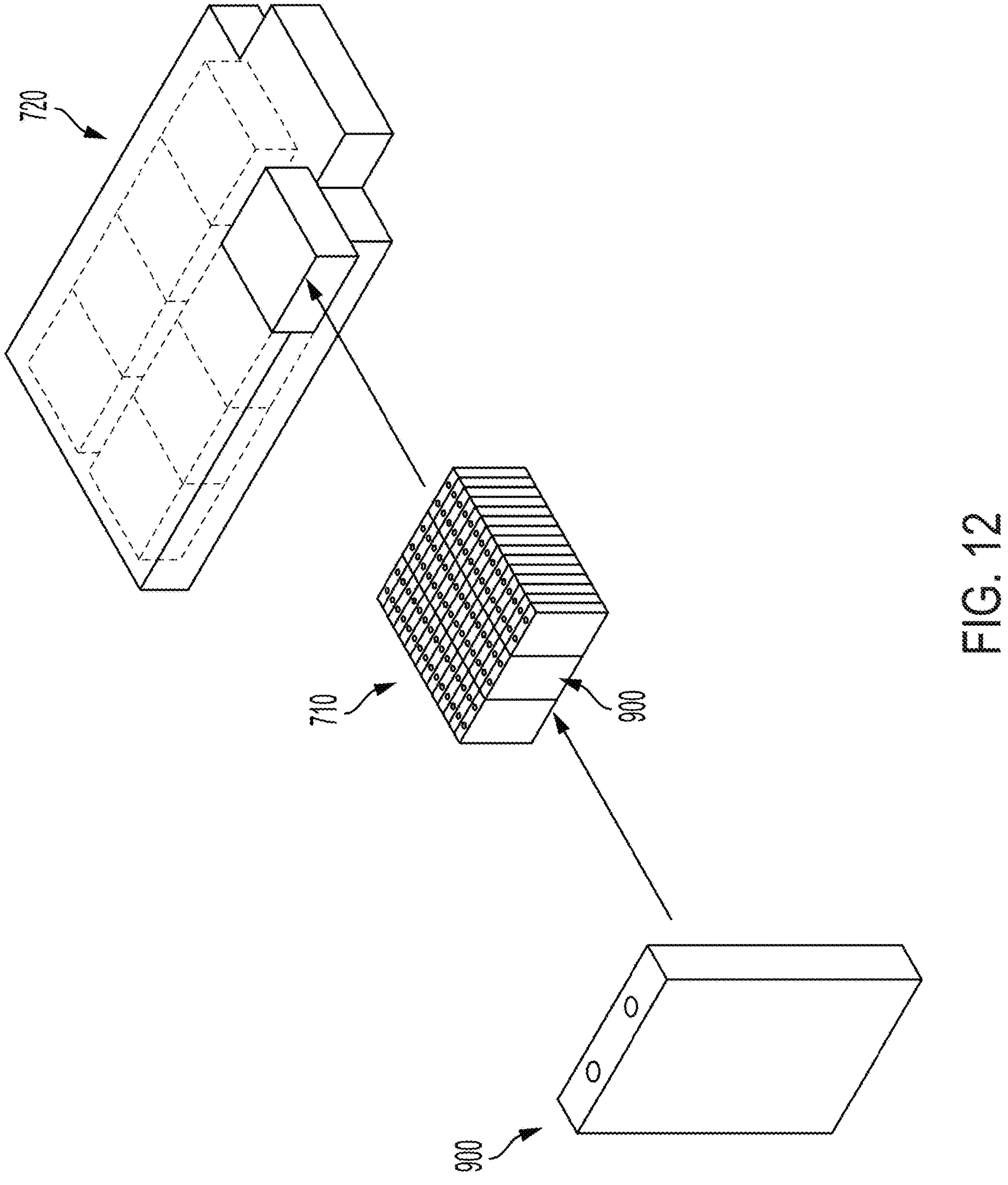
FIG. 12 illustrates prismatic battery cells being inserted into a frame to form a battery module and pack in accordance with some embodiments disclosed herein.
Figure 13:
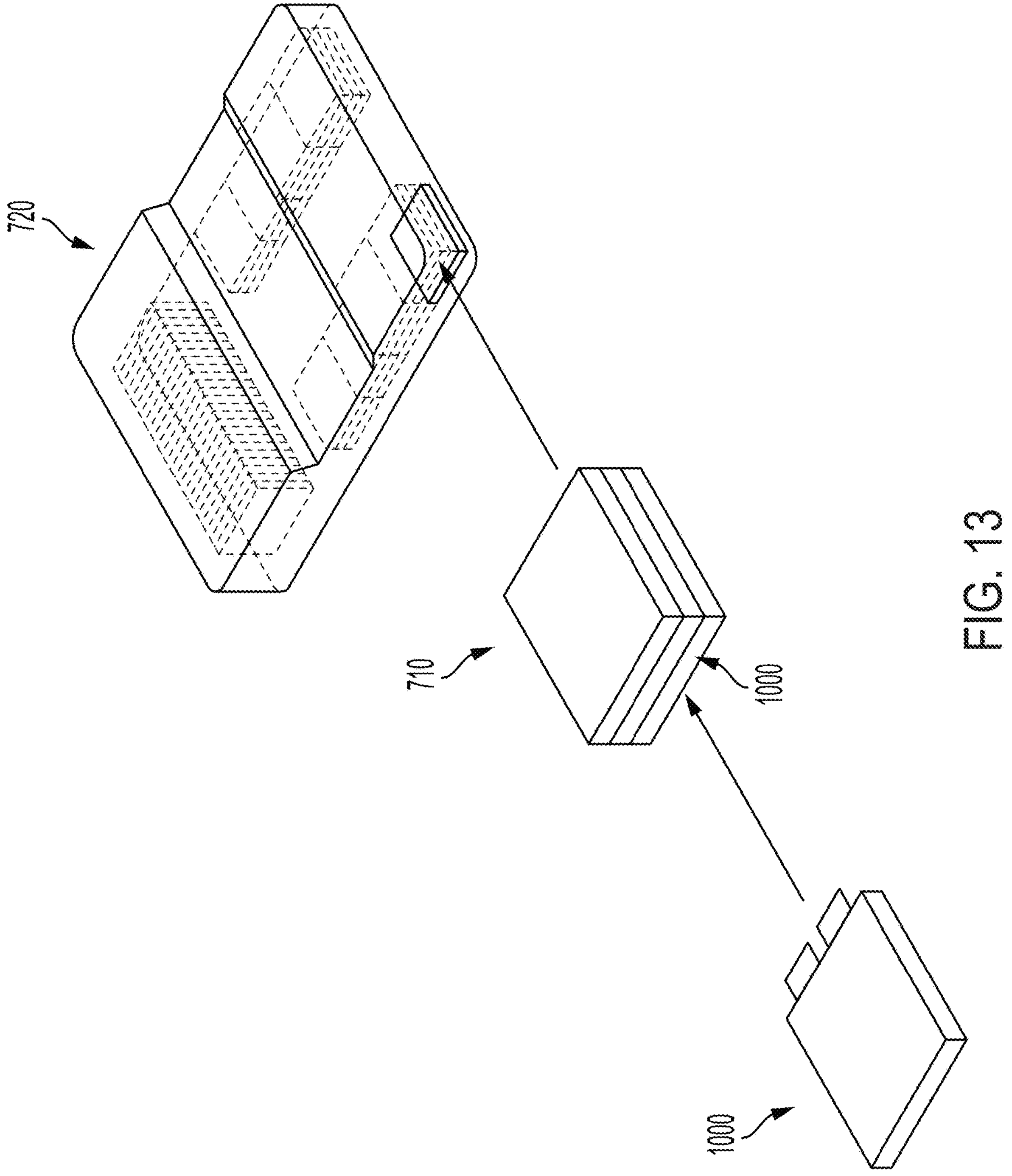
FIG. 13 illustrates pouch battery cells being inserted into a frame to form a battery module and pack in accordance with some embodiments disclosed herein.

A plurality of battery cells (800, 900, and/or 1000) can be assembled or packaged together in the same housing, frame, or casing to form a battery module and/or battery pack. The battery cells of a battery module can be electrically connected to generate an amount of electrical energy. These multiple battery cells can be linked to the outside of the housing, frame, or casing, through a uniform boundary. The battery cells of the battery module can be in parallel, in series, or in a series-parallel combination of battery cells. The housing, frame, or casing can protect the battery cells from a variety of dangers (e.g., external elements, heat, vibration, etc.). FIG. 11 illustrates cylindrical battery cells 800 being inserted into a frame to form battery module 710. FIG. 12 illustrates prismatic battery cells 900 being inserted into a frame to form battery module 710. FIG. 13 illustrates pouch battery cells 1000 being inserted into a frame to form battery module 710. In some embodiments, the battery pack may not include modules. For example, the battery pack can have a "module-free" or cell-to-pack configuration wherein battery cells are arranged directly into a battery pack without assembly into a module.

A plurality of the battery modules 710 can be disposed within another housing, frame, or casing to form a battery pack 720 as shown in FIGS. 11-13. In some embodiments, a plurality of battery cells can be assembled, packed, or disposed within a housing, frame, or casing to form a battery pack (not shown). In such embodiments, the battery pack may not include a battery module (e.g., module-free). For example, the battery pack can have a module-free or cell-to-pack configuration where the battery cells can be arranged directly into a battery pack without assembly into a battery module. In some embodiments, the battery cells of the battery pack can be electrically connected to generate an amount of electrical energy to be provided to another system (e.g., an electric vehicle).

The battery modules of a battery pack can be electrically connected to generate an amount of electrical energy to be provided to another system (e.g., an electric vehicle). The battery pack can also include various control and/or protection systems such as a heat exchanger system (e.g., a cooling system) configured to regulate the temperature of the battery pack (and the individual modules and battery cells) and a battery management system configured to control the battery pack's voltage, for example. In some embodiments, a battery pack housing, frame, or casing can include a shield on the bottom or underneath the battery modules to protect the battery modules from external elements. In some embodiments, a battery pack can include at least one heat exchanger (e.g., a cooling line configured to distribute fluid through the battery pack or a cold plate as part of a thermal/temperature control or heat exchange).

In some embodiments, battery modules can collect current or electrical power from the individual battery cells that make up the battery modules and can provide the current or electrical power as output from the battery pack. The battery modules can include any number of battery cells and the battery pack can include any number of battery modules. For example, the battery pack can have one, two, three, four, five, six, seven, eight, nine, ten, eleven, twelve or other number of battery modules disposed in the housing/frame/casing. In some embodiments, a battery module can include multiple submodules. In some embodiments, these submodules may be separated by a heat exchanger configured to regulate or control the temperature of the individual battery module. For example, a battery module can include a top battery submodule and a bottom battery submodule. These submodules can be separated by a heat exchanger such as a cold plate in between the top and bottom battery submodules.

The battery packs can come in all shapes and sizes. For example, FIGS. 11-13 illustrates three differently shaped battery packs 720. As shown in FIGS. 11-13, the battery packs 720 can include or define a plurality of areas, slots, holders, containers, etc. for positioning of the battery modules. The battery modules can come in all shapes and sizes. For example, the battery modules can be square, rectangular, circular, triangular, symmetrical, or asymmetrical. In some examples, battery modules in a single battery pack may be shaped differently. Similarly, the battery module can include or define a plurality of areas, slots, holders, containers, etc. for the plurality of battery cells.

Figure 14:
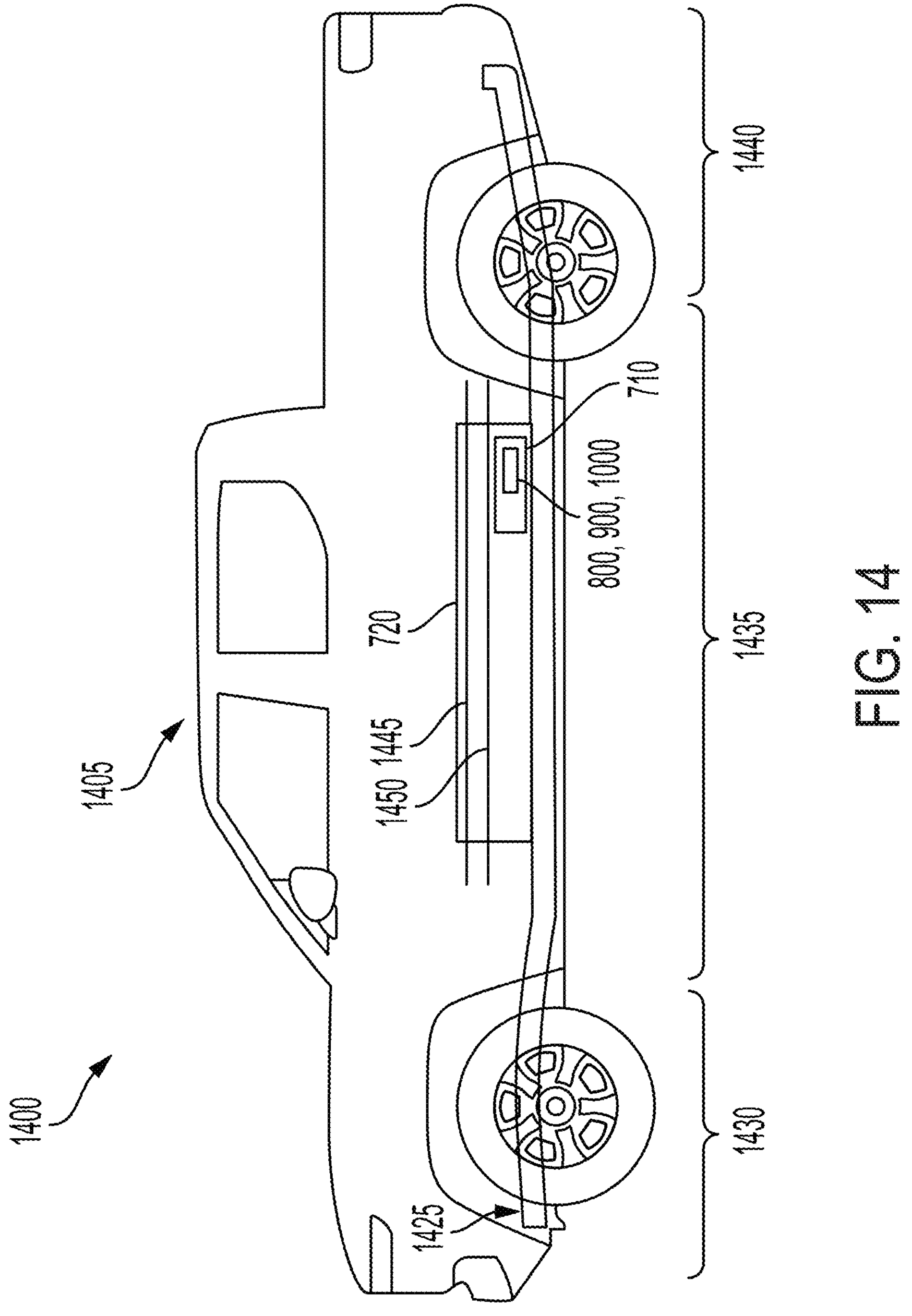
FIG. 14 illustrates an example of a cross sectional view of an electric vehicle that includes at least one battery pack in accordance with some embodiments disclosed herein.

FIG. 14 illustrates an example of a cross sectional view 1400 of an electric vehicle 1405 that includes at least one battery pack 720. Electric vehicles can include, but are not limited to, electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Electric vehicles can be fully electric or partially electric (e.g., plug-in hybrid) and further, electric vehicles can be fully autonomous, partially autonomous, or unmanned. In addition, electric vehicles can also be human operated or non-autonomous.

Electric vehicles 1405 can be installed with a battery pack 720 that includes battery modules 710 with battery cells (800, 900, and/or 1000) to power the electric vehicles. The electric vehicle 1405 can include a chassis 1425 (e.g., a frame, internal frame, or support structure). The chassis 1425 can support various components of the electric vehicle 1405. In some embodiments, the chassis 1425 can span a front portion 1430 (e.g., a hood or bonnet portion), a body portion 1435, and a rear portion 1440 (e.g., a trunk, payload, or boot portion) of the electric vehicle 1405. The battery pack 720 can be installed or placed within the electric vehicle 1405. For example, the battery pack 720 can be installed on the chassis 1425 of the electric vehicle 1405 within one or more of the front portion 1430, the body portion 1435, or the rear portion 1440. In some embodiments, the battery pack 720 can include or connect with at least one busbar, e.g., a current collector element. For example, the first busbar 1445 and the second busbar 1450 can include electrically conductive material to connect or otherwise electrically couple the battery pack 720 (and/or battery modules 710 or the battery cells 800, 900, and/or 1000) with other electrical components of the electric vehicle 1405 to provide electrical power to various systems or components of the electric vehicle 1405. In some embodiments, battery pack 720 can also be used as an energy storage system to power a building, such as a residential home or commercial building instead of or in addition to an electric vehicle.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method, comprising:

feeding a polyol, an isocyanate, and a sulfide into an extruder, wherein the polyol, the isocyanate, and the sulfide are fed into different zones of the extruder;

kneading the polyol, the isocyanate, and the sulfide in the extruder to form a sulfide-polymer composite comprising thermoplastic polyurethane and the sulfide; and extruding the sulfide-polymer composite to form a solid electrolyte layer, wherein the extruder is a heated twin screw extruder and all temperatures along a length of a screw barrel of the heated twin screw extruder are between 80-120° C.

2. The method of claim 1, wherein the sulfide comprises at least about 75% of a total weight of the polyol, isocyanate, and sulfide fed into the extruder.

3. The method of claim 1, wherein the sulfide is a ceramic sulfide.

4. The method of claim 1, wherein an amount of solvent fed to the extruder is such that the solvent is less than 5 wt. % the total weight of all components fed into the extruder.

5. The method of claim 1, wherein the polyol comprises polybutadiene diol, polyester diol, or combinations thereof.

6. The method of claim 1, wherein the polyol has a molecular weight of 500-5000 g/mol.

7. The method of claim 1, wherein the isocyanate comprises aliphatic diisocyanate, aromatic diisocyanate, or combinations thereof.

8. The method of claim 1, wherein a ratio of polyol to isocyanate fed into the extruder is 0.5-1.5.

9. The method of claim 1, wherein all temperatures along the length of the screw barrel of the heated twin screw extruder are between 80-115° C.

10. The method of claim 1, wherein the solid electrolyte layer has a thickness of 15-100 microns.

11. The method of claim 1, further comprising extruding the sulfide-polymer composite on a substrate comprising lithium metal.

12. The method of claim 1, further comprising feeding a lubricant into the extruder and/or feeding a solvent compatible with the sulfide into the extruder.

13. The method of claim 1, wherein the sulfide has a formula of:

$$Li_{7-a-b}PS_{6-a-b}X_aY_b$$

wherein X is Cl, Br or I; Y is Cl, Br or I; $0<a<2$; $0<b<2$.

14. The method of claim 1, wherein the sulfide has a formula of:

$$Li_{7-a-b}PS_{6-a-b-c}Z_cX_aY_b$$

wherein X is F, Cl, Br or I; Y is F, Cl, Br or I; Z is O, or Se; $0\leq a<2$; $0\leq b<2$; $0\leq c\leq 6$.

15. The method of claim 1, wherein the sulfide has a formula of:

$$xLi_2S_yP_2S_5$$

wherein $0<x<100$; $0<y<100$.

16. The method of claim 1, wherein the sulfide has a formula of:

$$Li_{7-x}X_{1-y}P_yS_{6-z}Y_z$$

wherein X is B, N, As, Sb, Al, Si, Ge, Ga, Sn; Y is F, Cl, Br, I; $0<x<2$; $0\leq y<1$; $0\leq z\leq 2$.

17. The method of claim 1, wherein the sulfide has a formula of:

$$Li_{8-x}M_{1-x}M'_xS_{4-y}O_y$$

wherein M is Si or Ge; M' is P, Al, Zn, Ga, Sb or V; $0<x<1.6$; $0\leq y<4$.

18. The method of claim 1, wherein the sulfide comprises at least about 85% of a total weight of the polyol, isocyanate, and sulfide fed into the extruder.

19. The method of claim 1, wherein the sulfide comprises at least about 95% of a total weight of the polyol, isocyanate, and sulfide fed into the extruder.

20. The method of claim 1, wherein the sulfide comprises about 75-99.9 wt. % of a total weight of the polyol, isocyanate, and sulfide fed into the extruder.

* * * * *